US011166334B2

(12) United States Patent
Wang et al.

(10) Patent No.: US 11,166,334 B2
(45) Date of Patent: Nov. 2, 2021

(54) METHODS FOR SUPPORTING SESSION CONTINUITY ON PER-SESSION BASIS

(71) Applicant: IDAC HOLDINGS, INC., Wilmington, DE (US)

(72) Inventors: Guanzhou Wang, Brossard (CA); Saad Ahmad, Montreal (CA); Mahmoud Watfa, Saint Leonard (CA); Ulises Olvera-Hernandez, London (GB); Xiaoyan Shi, Westmount (CA); Bartosz Balazinski, Montreal (CA)

(73) Assignee: IDAC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/310,594

(22) PCT Filed: Jun. 30, 2017

(86) PCT No.: PCT/US2017/040375
§ 371 (c)(1),
(2) Date: Dec. 17, 2018

(87) PCT Pub. No.: WO2018/006017
PCT Pub. Date: Jan. 4, 2018

(65) Prior Publication Data
US 2019/0150219 A1 May 16, 2019

Related U.S. Application Data

(60) Provisional application No. 62/357,567, filed on Jul. 1, 2016, provisional application No. 62/377,917, filed (Continued)

(51) Int. Cl.
*H04W 36/00* (2009.01)
*H04W 76/19* (2018.01)
(Continued)

(52) U.S. Cl.
CPC ........... *H04W 76/19* (2018.02); *H04W 12/06* (2013.01); *H04W 36/0022* (2013.01);
(Continued)

(58) Field of Classification Search
None
See application file for complete search history.

(56) References Cited

U.S. PATENT DOCUMENTS 9,124,608 B2  9/2015 Jin et al.
10,320,915 B2 6/2019 Agiwal et al.
(Continued)

FOREIGN PATENT DOCUMENTS

WO    2017/143047    8/2017

OTHER PUBLICATIONS

Catt et al., "Update PDU session anchor relocation for SSC mode 3 with multiple PDU sessions," 3GPP TSG SA WG2 Meeting #120, S2-172836, Busan, Korea (Mar. 27-31, 2017).
(Continued)

*Primary Examiner* — Jenkey Van
(74) *Attorney, Agent, or Firm* — Volpe Koenig

(57) ABSTRACT

A method and a system are disclosed for providing session continuity in a 5G system. A wireless transmit receive unit (WTRU) may receive, from a session management function (SMF), a first Non-Access Stratum (NAS) message indicating a Packet Data Unit (PDU) session re-establishment. Upon receiving the first NAS message, the WTRU may determine an old PDU session ID based on the NAS message and generate a new PDU session ID. The WTRU may transmit a second NAS message indicating a PDU session establishment request. The second NAS message may include the old and new PDU session IDs. Upon receiving the PDU session establishment request, the SMF may determine that the old PDU session ID is associated
(Continued)

with an existing PDU session for which the PDU session re-establishment is requested. The SMF may also determine that the new PDU session ID is associated with a new PDU session to be established.

16 Claims, 26 Drawing Sheets

Related U.S. Application Data on Aug. 22, 2016, provisional application No. 62/472,899, filed on Mar. 17, 2017, provisional application No. 62/472,743, filed on Mar. 17, 2017.

(51) Int. Cl.
*H04W 76/30* (2018.01)
*H04W 12/06* (2021.01)
*H04W 48/18* (2009.01)
H04W 36/30 (2009.01)

(52) U.S. Cl.
CPC ....... *H04W 36/0033* (2013.01); *H04W 48/18* (2013.01); *H04W 76/30* (2018.02); *H04W 36/305* (2018.08)

(56) References Cited

U.S. PATENT DOCUMENTS

| | | | |
|---|---|---|---|
| 2013/0003698 A1 | 1/2013 | Olvera-Hernandez et al. | |
| 2017/0288972 A1* | 10/2017 | Li | H04L 41/0803 |
| 2017/0339609 A1* | 11/2017 | Youn | H04W 76/11 |
| 2018/0103368 A1* | 4/2018 | Son | H04W 8/26 |
| 2018/0192471 A1* | 7/2018 | Li | H04W 4/60 |
| 2018/0198867 A1* | 7/2018 | Dao | H04W 36/0033 |
| 2018/0227743 A1* | 8/2018 | Faccin | H04W 76/10 |
| 2018/0227873 A1* | 8/2018 | Vrzic | H04W 76/27 |
| 2019/0090164 A1* | 3/2019 | Ding | H04W 8/08 |
| 2019/0349721 A1* | 11/2019 | Zhu | H04W 8/24 |

OTHER PUBLICATIONS

Gilligan et al., "Basic Socket Interface Extensions for IPv6," Network Working Group, Request for Comments: 3493 (Feb. 2003).
Intel, "Update of Solution 6.1," SA WG2 Meeting #115, S2-163186, Nanjing, P.R. China (May 23-27, 2016).
Interdigital, "Determination of SSC Mode for PDU session," SA WG2 Meeting #116BIS, S2-164539, Sanya, China (Aug. 29-Sep. 2, 2016).
Interdigital, "Network triggered SSC mode update for an ongoing PDU session," SA WG2 Meeting #116, S2-163506, Vienna, Austria (Jul. 11-15, 2016).
Interdigital, "PDU session association in SSC mode 2 and SSC mode 3," SA WG2 Meeting #120, S2-171972, Busan, Korea (Mar. 27-31, 2017).
Interdigital, "UE triggered SSC mode update," SA WG2 Meeting #117, S2-165715, Kaohsiung city, Taiwan (Oct. 17-21, 2016).
LG Electronics, "TS 23.502: DN authorization and PDU session anchor relocation," SA WG2 Meeting #122, S2-174591, San Jose Del Cabo, Mexico (May 26-30, 2017).
Nokia et al., "23.501 §5.8.2: SSC mode 1 and Multi Homing," SA WG2 Meeting #119, S2-171557, Dubrovnik, Croatia (Feb. 13-17, 2017).
Nokia et al., "Solution for Mobility levels," SA WG2 Meeting #115, S2-162526, Nanjing, P.R. China (May 23-27, 2016).
Stevens et al., "Advanced Sockets Application Program Interface (API) for IPv6," Network Working Group, Request for Comments: 3542 (May 2003).
Third Generation Partnership Project, "Technical Specification Group Services and System Aspects; System Architecture for the 5G System; Stage 2 (Release 15)," 3GPP TS 23.501 V0.3.1 (Mar. 2017).
Third Generation Partnership Project, "Technical Specification Group Services and System Aspects; Study on Architecture for Next Generation System (Release 14)," 3GPP TR 23.799 V14.0.0 (Dec. 2016).
Third Generation Partnership Project, "Technical Specification Group Services and System Aspects; Procedures for the 5G System; Stage 2 (Release 15)," 3GPP TS 23.502 V0.2.0 (Feb. 2017).
Third Generation Partnership Project, "Technical Specification Group Services and System Aspects; Procedures for the 5G System; Stage 2 (Release 15)," 3GPP TS 23.502 V0.4.0 (May 2017).
Third Generation Partnership Project, "Technical Specification Group Services and System Aspects; System Architecture for the 5G System; Stage 2 (Release 15)," 3GPP TS 23.501 V1.0.0 (Jun. 2017).
Third Generation Partnership Project, "Technical Specification Group Services and System Aspects; System Architecture for the 5G System; Stage 2 (Release 15)," 3GPP TS 23.501 V0.3.0 (Feb. 2017).
Third Generation Partnership Project, "Technical Specification Group Services and System Aspects; Policy and charging control architecture (Release 14)," 3GPP TS 23.203 V14.4.0 (Jun. 2017).
Third Generation Partnership Project, "Technical Specification Group Services and System Aspects; Policy and charging control architecture (Release 14)," 3GPP TS 23.203 V14.2.0 (Dec. 2016).
Third Generation Partnership Project, "Technical Specification Group Services and System Aspects; Policy and charging control architecture (Release 14)," 3GPP TS 23.203 V14.0.0 (Jun. 2016).
Third Generation Partnership Project, "Technical Specification Group Services and System Aspects; General Packet Radio Service (GPRS) enhancements for Evolved Universal Terrestrial Radio Access Network (E-UTRAN) access (Release 14)," 3GPP TS 23.401 V14.4.0 (Jun. 2017).
Third Generation Partnership Project, "Technical Specification Group Services and System Aspects; General Packet Radio Service (GPRS) enhancements for Evolved Universal Terrestrial Radio Access Network (E-UTRAN) access (Release 14)," 3GPP TS 23.401 V14.0.0 (Jun. 2016).
Third Generation Partnership Project, "Technical Specification Group Services and System Aspects; General Packet Radio Service (GPRS) enhancements for Evolved Universal Terrestrial Radio Access Network (E-UTRAN) access (Release 14)," 3GPP TS 23.401 V14.2.0 (Dec. 2016).
Third Generation Partnership Project, "Technical Specification Group Services and System Aspects; General Packet Radio Service (GPRS) enhancements for Evolved Universal Terrestrial Radio Access Network (E-UTRAN) access (Release 15)," 3GPP TS 23.401 V15.0.0 (Jun. 2017).
Third Generation Partnership Project, "Technical Specification Group Radio Access Network; Study on new radio access technology: Radio access architecture and interfaces (Release 14)," 3GPP TR 38.801 V14.0.0 (Mar. 2017).
Third Generation Partnership Project, "Technical Specification Group Radio Access Network; Study on New Radio Access Technology; Radio Access Architecture and Interfaces (Release 14),"3GPP TR 38.801 V0.2.0 (Jun. 2016).
Third Generation Partnership Project, "Technical Specification Group Services and System Aspects; Telecommunication management; Charging management; Study on charging aspects of 5G system architecture Phase 1 (Release 15)," 3GPP TR 32.899 V0.2.0 (May 2017).
Third Generation Partnership Project, "Technical Specification Group Services and System Aspects; Study on Architecture for Next Generation System (Release 14)," 3GPP TR 23.799 V0.5.0 (May 2016).
Third Generation Partnership Project, "Technical Specification Group Services and System Aspects; Study on Architecture for Next Generation System (Release 14)," 3GPP TR 23.799 V1.2.0 (Nov. 2016).

(56) References Cited

OTHER PUBLICATIONS

Yegin et al., "On Demand Mobility Management," draft-ietf-dmm-ondemand-mobility-06, DMM Working Group, Internet-Draft (Jun. 30, 2016).

* cited by examiner

METHODS FOR SUPPORTING SESSION CONTINUITY ON PER-SESSION BASIS

CROSS REFERENCE TO RELATED APPLICATION

This application is the U.S. National Stage, under 35 U.S.C. § 371, of International Application No. PCT/US2017/040375 filed Jun. 30, 2017, which claims the benefit of U.S. Provisional Application No. 62/357,567, filed on Jul. 1, 2016, U.S. Provisional Application No. 62/377,917, filed on Aug. 22, 2016, U.S. Provisional Application No. 62/472,899, filed on Mar. 17, 2017, and U.S. Provisional Application No. 62/472,743, filed on Mar. 17, 2017, the contents of which are hereby incorporated by reference herein.

BACKGROUND

In a wireless network, mobility refers to a network system's ability to provide seamless service to users/devices that are moving. Studies by the 3rd Generation Partnership Project (3GPP) on a fifth generation (5G) wireless communication system have shown that 5G networks will have to support an increasingly large number of moving and unmoving devices, ranging from very high mobility, such as high-speed trains/airplanes, to low mobility or stationary devices such as smart meters. Thus, 5G networks should provide efficient mobility support such as mobility on demand. Mobility on demand may provide mobility support only to those devices and services that need it. For example, while a wireless transmit receive unit (WTRU) is connected to an IP data network (e.g., a protocol data unit (PDU) session with the IP data network), 5G networks should support service and session continuity to provide seamless service to the WTRU. Thus, it would be desirable to have a method and apparatus configured to support the service and session continuity on a per-session basis using Service and Session Continuity (SSC) modes.

SUMMARY

A method and a system are disclosed for providing session continuity in a fifth generation (5G) wireless network. For example, a wireless transmit receive unit (WTRU) may receive, from a session management function (SMF), a first Non-Access Stratum (NAS) message indicating that a Packet Data Unit (PDU) session re-establishment is requested. Upon receiving the first NAS message, the WTRU may determine an old PDU session ID based on the first NAS message and generate a new PDU session ID to establish a new PDU session. The WTRU may transmit a second NAS message indicating a PDU session establishment request. The PDU session establishment request may include a mobility management (MM) message and a session management (SM) message. The MM message may include the old PDU session ID and the SM message may include the new PDU session ID. The WTRU may transmit the second NAS message to an Access Mobility Function (AMF) where the SM message of the PDU session establishment request may be routed to the SMF. Upon receiving the PDU session establishment request, the SMF may determine that the old PDU session ID is associated with an existing PDU session for which the PDU session re-establishment is required. The SMF may also determine that the new PDU session ID is associated with a new PDU session to be established.

BRIEF DESCRIPTION OF THE DRAWINGS

A more detailed understanding may be had from the following description, given by way of example in conjunction with the accompanying drawings wherein.

DETAILED DESCRIPTION

Figure 1A:
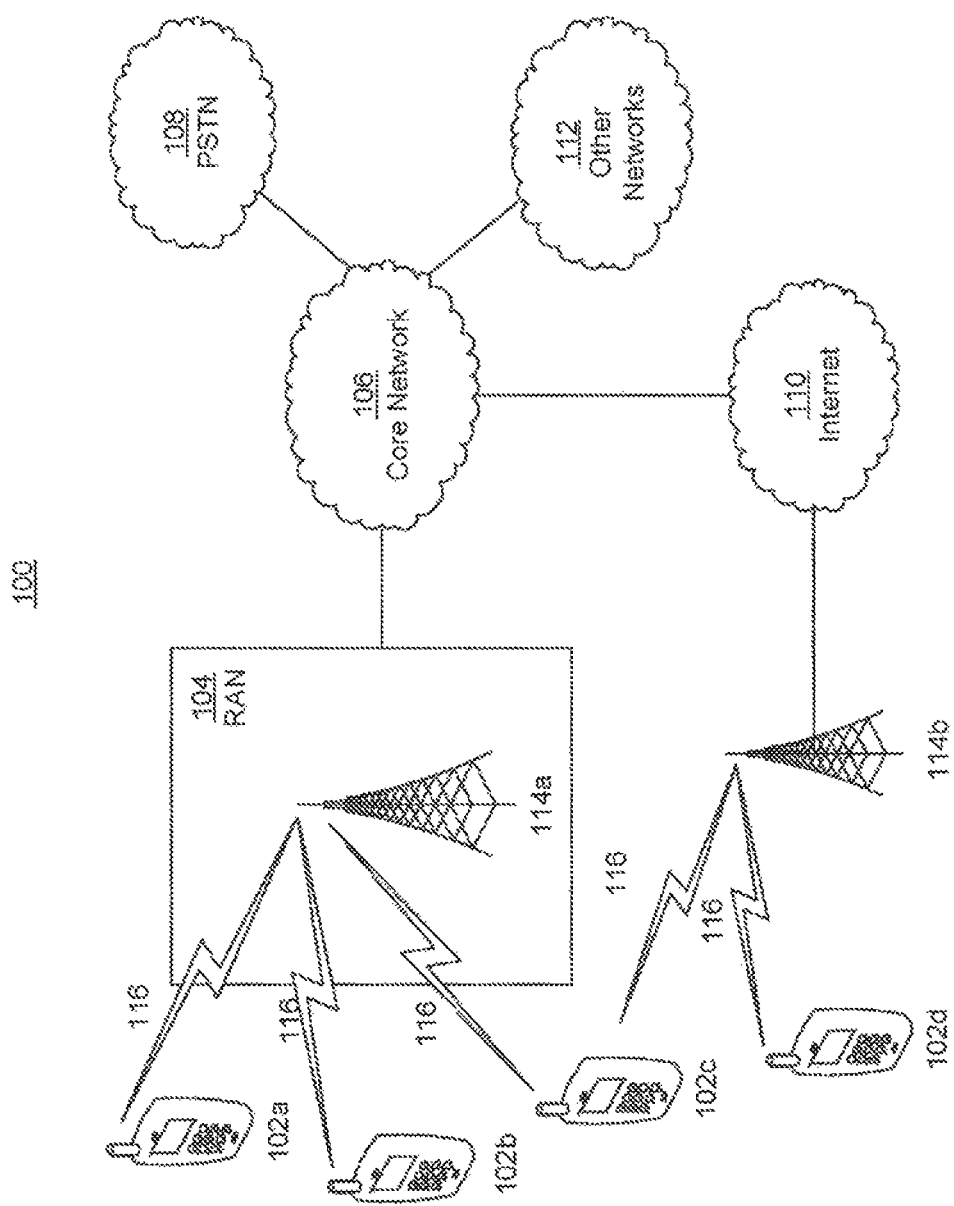
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as Institute for Electrical and Electronics Engineers (IEEE) 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
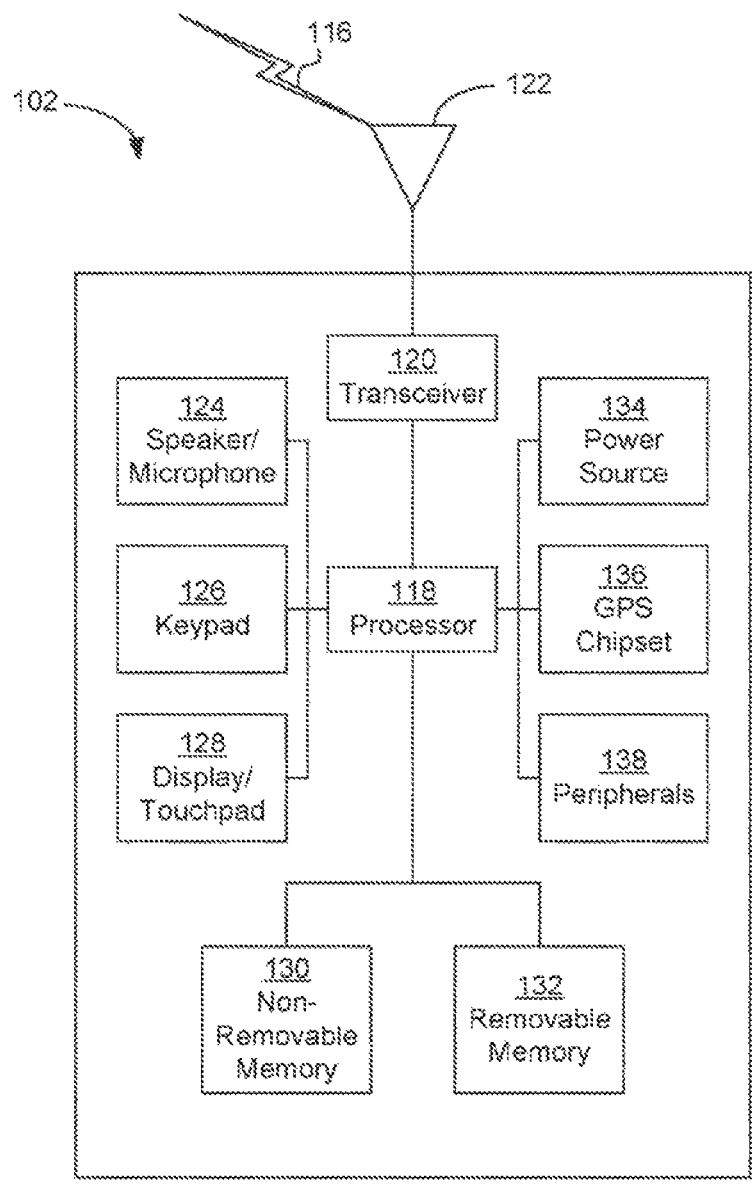
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
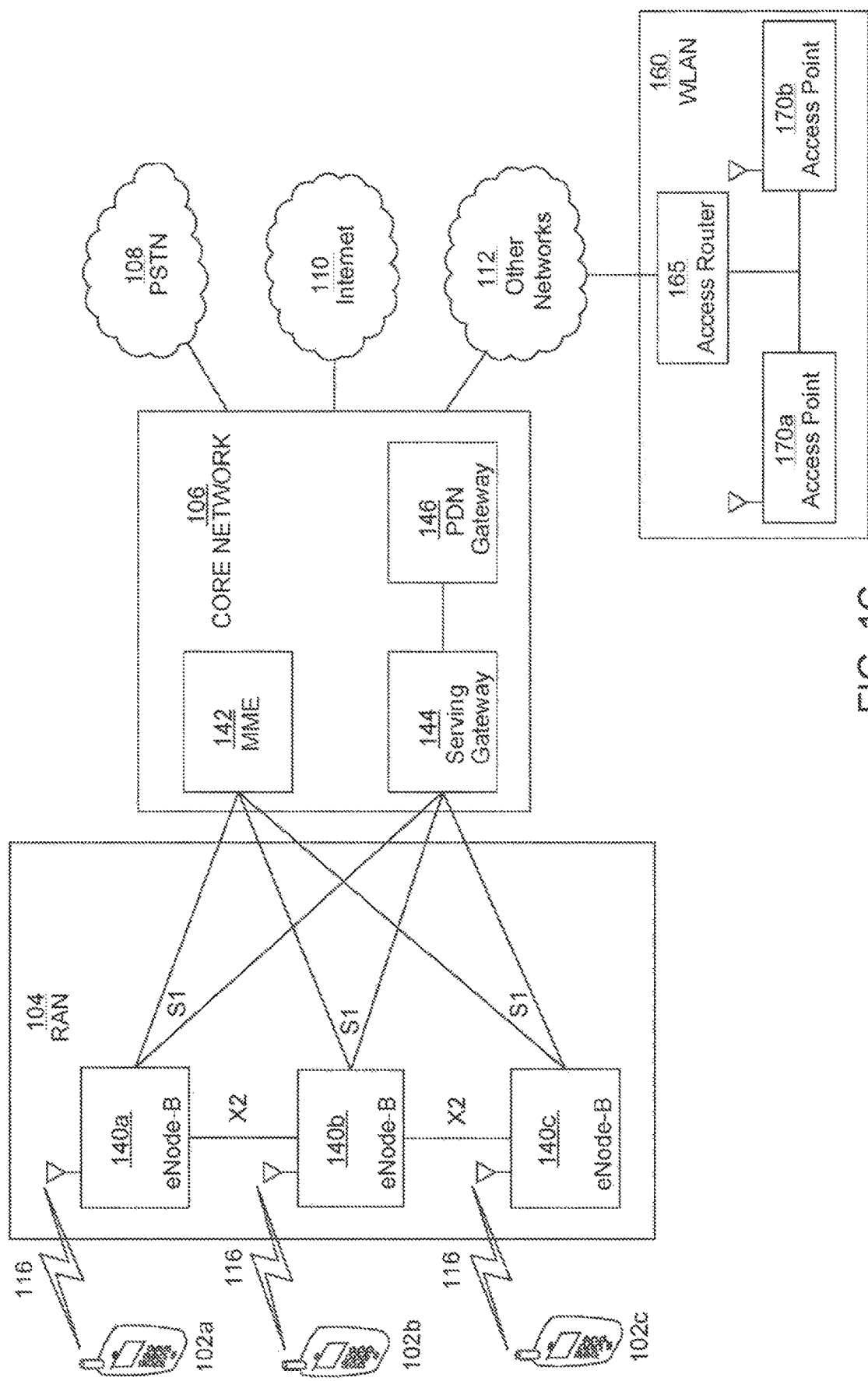
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with various networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the various networks including the PSTN 108, Internet 110 and other networks 112, which in turn may include other wired or wireless networks that are owned and/or operated by other service providers.

Other networks 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

In fourth generation (4G) wireless systems, a RAN 104 may be referred to as Evolved-Universal Mobile Telecommunications System (UMTS) Terrestrial Radio Access Network (E-UTRAN), evolved Node B (eNodeB or eNB), LTE, or LTE RAN. As used herein, the terms E-UTRAN, eNodeB, LTE, LTE RAN or RAN and variations thereof may be used interchangeably throughout this disclosure. A Core Network 106 in 4G wireless systems may be referred to as Evolved Packet Core (EPC). Similarly, in fifth generation (5G) or next generation (NG) wireless systems, the RAN 104 may be referred to as New Radio (NR), 5G NR, NextGen RAN. As used herein, the terms NR, 5G NR, NextGen RAN (NG RAN) or RAN, and variations thereof may be used interchangeably throughout this disclosure. A core network in 5G wireless systems may be referred to as 5G Core Network (5G CN), 5G Core (5GC), NextGen CN (NG CN), NGC, and variations thereof may be used interchangeably throughout this disclosure. Between 4G and 5G wireless systems, interworking scenarios (e.g., including mobility) may exist for an EPC and a 5G CN.

Figure 2:
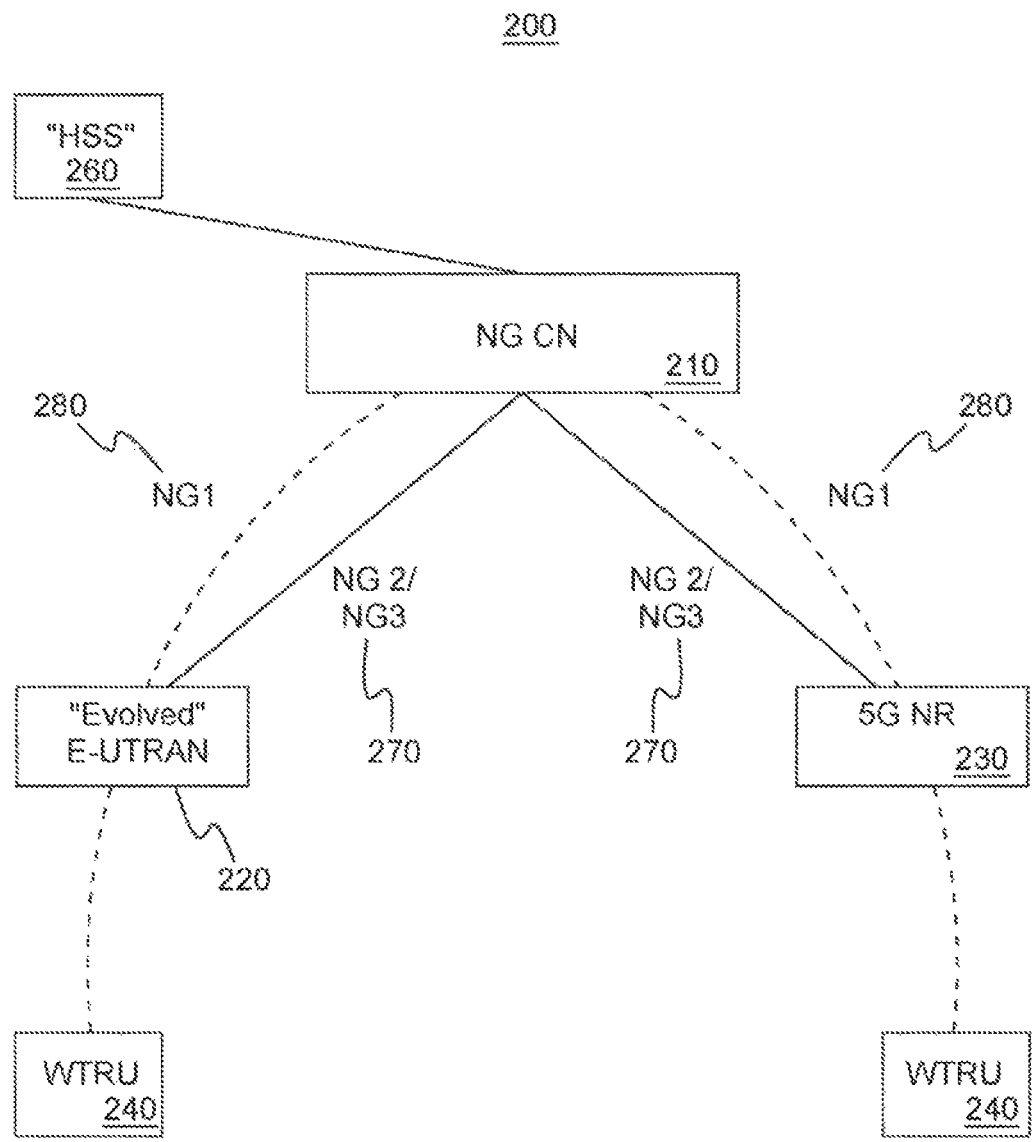
FIG. 2 is a diagram of an example architecture which illustrates Evolved-Universal Terrestrial Radio Access Network (E-UTRAN) and 5G New Radio (NR) interworking for an example scenario.

FIG. 2 is an example architecture 200 of Evolved E-UTRAN 220 and 5G NR 230 interworking for an example scenario. Evolved E-UTRAN 220 may be E-UTRAN that can support access to an NG CN 210. Interworking (e.g., idle and connected mode mobility) between Evolved E-UTRAN 220 and 5G NR 230 may be performed using NG CN 210 procedures. As shown in FIG. 2, a network operator may deploy the 5G NR 230 in conjunction with the NG CN 210. The network operator may upgrade installed E-UTRAN nodes, for example, to support a NG2/NG3 270 between the NG CN 210 and the RAN (i.e. Evolved E-UTRAN 220 or 5G NR 230) for WTRUs 240. The NG2/NG3 270 may be interfaces that are used to transfer control plane messages and user plane data. Specifically, the NG2 may transfer control messages for mobility management between control plane functions in the NG CN 210 and the RAN (i.e. Evolved E-UTRAN 220 or 5G NR 230). The NG3 may transfer user traffic between user plane functions in the NG CN 210 and the RAN (i.e. Evolved E-UTRAN 220 or 5G NR 230). The NG1 280 may be interface that is used to carry authentication messages between the WTRU 240 and the NG CN 210. Home Subscriber Server (HSS) 260 may be database that contains all the user subscription information, including user identification information such as International Mobile Subscriber Identity (IMSI), Mobile Subscriber ISDN Number (MSISDN), or mobile telephone number, and user profile information that includes service subscription states and user-subscribed Quality of Service information. A HSS 260 may provide the NG CN 210 authentication and security information for the WTRUs 240. In this scenario, service continuity may (e.g., only) be provided between the Evolved E-UTRAN 220 and the RAN (i.e. Evolved E-UTRAN 220 or 5G NR 230) that are connected to the NG CN 210.

Figure 3:
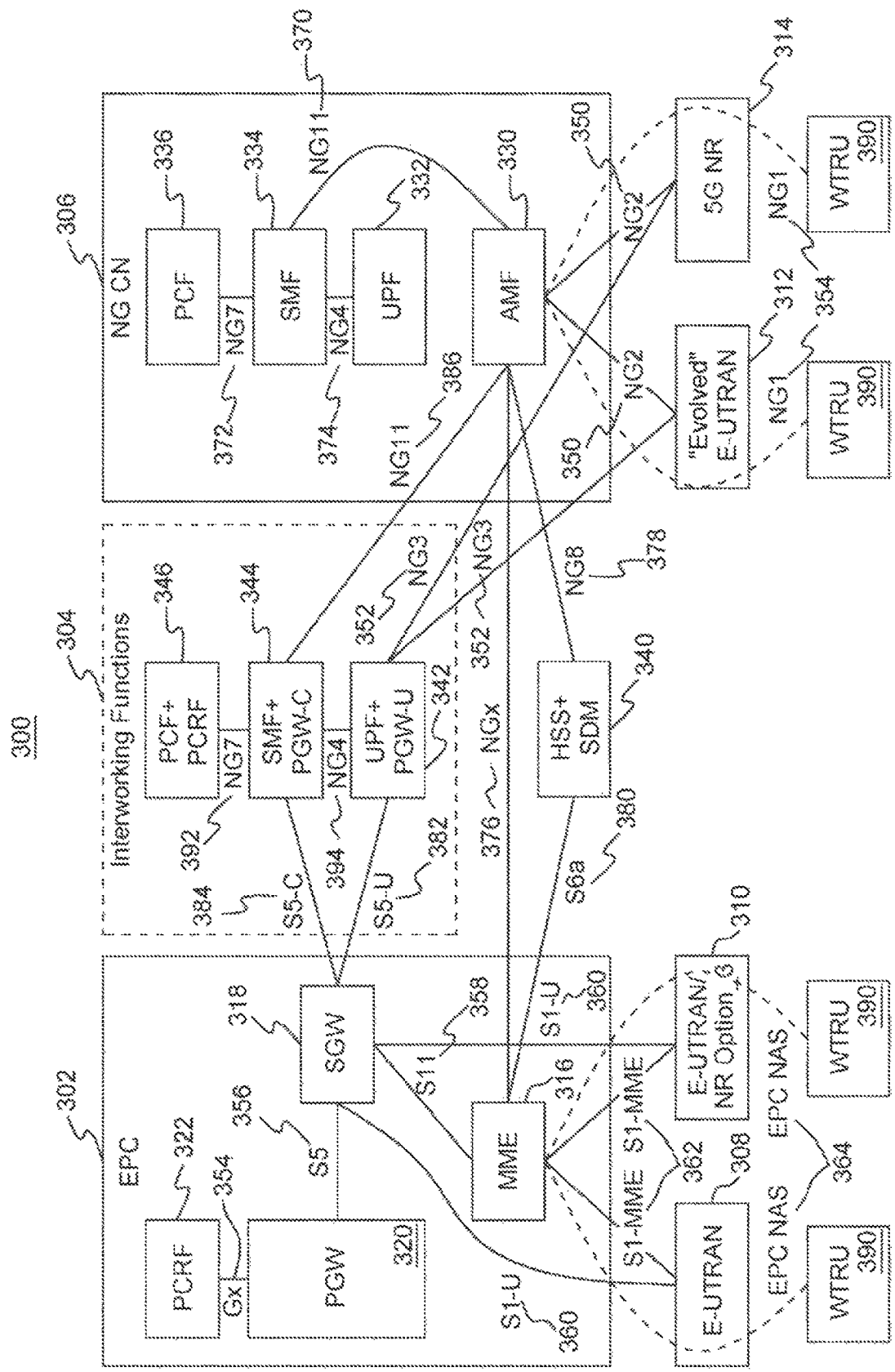
FIG. 3 is a diagram of an example architecture which illustrates Evolved Packet Core (EPC) and Next Generation Core Network (NG CN) interworking for an example scenario.

FIG. 3 is an example architecture of EPC 302 and NG CN 306 interworking for an example scenario. In this example internetworking scenario, a network operator may (i) not upgrade installed E-UTRAN nodes such as E-UTRAN 308, (ii) upgrade parts of installed E-UTRAN nodes such as Evolved E-UTRAN 312 to support a NG2 350/NG3 352 between CN and RAN or (iii) deployed E-UTRAN/NR Option_3 310 for macro coverage and stand-alone NR with the NG CN 306 (e.g., for small cells). The E-UTRAN/NR Option_3 310 is a 5G deployment option in which a 5G NR is deployed as a secondary RAT and connected to an EPC via eNodeB. An Interworking Functions 304 may be provided from the EPC 302 to the NG CN 306, for example, to provide full service continuity.

As described above, the EPC 302 may include a mobility management entity (MME) 316, a serving gateway (SGW) 318, a packet data network (PDN) gateway (PGW) 320 and a Policy and Charging Rules Function (PCRF) 322. The MME 316 may be connected to each of E-UTRAN 308 and E-UTRAN/NR 310 via an S1-MME 362 interface and may serve as a control node. The MME 316 may be the termination point in the network for ciphering/integrity protection for NAS signaling and may handle the security key management via EPC NAS 364. The MME 316 may also provide the control plane function for mobility between LTE and 2G/3G/5G access networks.

The SGW 318 may be connected to each of E-UTRAN 308 and E-UTRAN/NR 310 via the S1-U interface. The SGW 318 may also be connected to the MME 316 via the S11 358 interface. The SGW 318 may generally route and forward user data packets from/to the WTRUs 390, while also acting as an anchor for mobility between LTE and other 3GPP technologies. The serving gateway 318 may be connected to the PGW 320 via S5 356 interface, which may provide the WTRUs 390 with access to packet-switched networks, such as the Internet. The PCRF 322 may be connected to PGW 320 via Gx 354 interface to determine policy rules in the network. The PCRF 322 may manage the service policy and send QoS setting information for each user session and accounting rule information. The PCRF 322 may include policy decision function (PDF) and charging rules function (CRF).

Unlike the EPC 302 that defines functions, connections, and protocols based on network entities such as an MME 316, a SGW 318, and a PGW 320, the NG CN 306 may define functions, connections, and protocols based on network functions (NFs). For example, the NG CN 306 may include an Access and Mobility Management Function (AMF) 330, a User Plane Function (UPF) 332, a Session Management Function (SMF) 334, and a Policy Control Function (PCF) 336 in one or more network slice instances (NSI) to provide control plane functions and user plane data to WTRUs 390. The AMF 330 may be connected to each of Evolved E-UTRAN 312 and 5G NR 314 via NG2 interfaces and may serve as a core network control function (CN CP). The NG2 350 interface may carry control messages for mobility management between the AMF 330 and the RAN (i.e. Evolved E-UTRAN 312 or 5G NR 314). The AMF 330 may also be connected to WTRUs 390 via NG1 354 interfaces to carry authentication messages between the WTRU 390 and the AMF 330. The AMF 330 may provide mobility management functions per WTRU basis independently of Radio Access Technologies (RATs). Thus, the AMF 330 may be connected with a single WTRU for mobility management. The AMF 330 may also perform a network slice selection for the WTRUs 390.

The SMF 334 may be connected to the AMF 330 via an NG11 370 interface to provide session managements to the WTRUs 390. If a WTRU 390 has multiple sessions, the WTRU may be assigned to multiple SMFs 334 to manage each of the multiple sessions. The SMF 334 may set up and manage sessions according to a network policy in the PCF 336. The network policy information may be carried via an NG7 372 interface. The PCF 336 may include network policy information related to session management or mobility management and provide such policy information to the AMF 330 and SMF 334. The SMF 334 may also determine a UPF 332 based on control information received from the AMF 330. The UPF 332 may receive protocol data unit (PDU) transmitted from the WTRUs 390. Although it is not shown in FIG. 3, the UPF 332 may be connected to a data network (DN) and may receive PDU from the DN. The UPF 332 may report its status to the SMF 334 via an NG4 374 interface.

The example scenario in FIG. 3 may include non-roaming and roaming with local breakout scenarios. An NGx 376 interface may be introduced between the MME 316 and the AMF 330, for example, to enable interworking between the EPC 302 and the NG CN 306. The NGx 376 may be an inter-core network (CN) interface. The terms NGx and Nx may be used interchangeably throughout this disclosure. A PCF 336 may be involved, for example, when policy and charging may be dynamically controlled.

WTRUs 390 may use EPC NAS 364 with the core network (i.e. EPC 302), for example, when connecting to the RAN (i.e. E-UTRAN 308 or E-UTRAN/NR 310). As described above, the MME 316 may perform authentication, mobility management and session management towards the WTRU 390, for example, when connected to a non-evolved E-UTRAN 308. Idle or connected mode mobility may be supported between the EPC 302 and the NG CN 306. For example, WTRUs 390 serving the MME 316 in the EPC 302 may connect, via the NGx 376 interface that carries control plane messages, to the AMF 330 in the NG CN 306. A Home Subscriber Server+Subscriber Data Management (HSS+SDM) 340 may be connected to the MME 316 and the AMF 330 via an S6a 380 interface and an NG8 378 interface respectively. The HSS+SDM may provide subscriber's data and authentication information while the WTRUs 390 are connecting to the NG CN 306 or EPC 302.

WTRUs 390 being served by the SGW 318 may connect, via the Interworking Functions 304, to user plane functions and/or CP functions in the NG CN 306. Specifically, the WTRUs 390 may be connected to the AMF 330 and/or SMF 370 via an SMF+PGW-C 344 or IPF+PGW-U 342 for control plane messages and user plane data respectively. The SMF+PGW-C 344 may be connected to the SGW 318 via an S5-C 384 interface and the AMF 330 via an NG11 386 to carry control plane messages between the SGW 318 and the AMF 330. The SMF+PGW-U 342 may be connected to the SGW 318 via an S5-U 382 interface and the RAN (i.e. Evolved E-UTRAN 312 or 5G NR 314) via an NG3 352 to carry user plane information. The user plane information received at Evolved E-UTRAN 312 or 5G NR 314 may be carried to the AMF 330 via an NG2 350 interface. After that, the user plane information may be carried to the SMF 334 and UPF 332 via the NG11 370 and NG4 374 interfaces respectively. A PCF+PCRF 346 may be connected to the SMF+PGW-C via an NG7 392 to provide service and network policy information. The service and network policy information may be carried to an UPF+PGW-U 342 via an NG4 394 interface.

In an embodiment, a user plane may be anchored in the NG CN 306 for WTRUs 390 that have a 5G NR 314 subscription. In that case, a gateway (GW) selection may still be performed by the MME 316. However, if the WTRUs 390 includes subscriptions that enable the NG CN 306, it may result in a GW in the NG CN 306.

Interworking with 5G network systems may be performed, for example, by enabling a WTRU 390 to perform an initial attach over E-UTRAN 308 or E-UTRAN/NR 310 using EPC NAS 364. After the initial attach in the EPC 302, the WTRU 390 may move to Evolved E-UTRAN 312 or 5G NR 314 using NAS messages via NG1 354 interfaces by interworking with the NG CN 306. This means that the context of the WTRU 390 may be moved to the NG CN 306. During the initial attach over E-UTRAN, the user plane of the WTRU 390 may be anchored in a user plane function such as the UPF 332 provided by the NG CN 306 to support mobility.

Interworking with 5G network systems may be performed, for example, by enabling a WTRU 390 to perform initial attach and session management over Evolved E-UTRAN 312 or 5G NR 314 using the NG1 354 interface. After the initial attach and session management, the WTRU 390 may move to E-UTRAN 308 or E-UTRAN/NR 310 using EPC NAS 364 by interworking with the NG CN 306. For example, the context of the WTRU 390 may be moved from the NG CN 306 to the E-UTRAN 308.

A network operator may provide service continuity between E-UTRAN 308 (or E-EUTRAN/NR 310) and 5G NR 314 (or Evolved E-EUTRAN 312) by deploying the Interworking Functions 304 and common anchoring of the user plane. A WTRU 390 that may support both NG NAS and EPC NAS 364 may operate in a single-registration mode or a dual-registration mode, for example, to interwork with the EPC 302. In the single registration mode, the WTRU 390 may have an active MM state (e.g., an RM state in NG CN 306 or an EMM state in EPC 302). It may be either in a NG CN NAS mode when the WTRU 390 is connected to the NG CN 306 or in an EPC NAS mode when the WTRU 390 is connected to the EPC 302. Similarly, a network may maintain a state in the AMF 330 or in the MME 316. In addition, the WTRU 390 may maintain the single coordinated registration for the NG CN 306 and the EPC 302. In the dual-registration mode, the WTRU 390 may handle independent registrations for the NG CN 306 and the EPC 302. For example, in this mode, the WTRU 390 may be registered to the NG CN 306 only, the EPC 302 only or both NG CN 306 and EPC 302.

In an embodiment, mobility may be supported in single-registration mode. Although an NGx 376 interface between the AMF 330 in the NG CN 306 and the MME 316 in the EPC 302 is optional, the NGx 376 interface may be required, for example, when seamless session continuity for voice may be needed. If the NGx 376 is supported, a WTRU 390, for idle-mode mobility from the NG CN 306 to the EPC 302, may perform a Tracking Area Update (TAU) procedure with 4G-Globally Unique Temporary Identity (GUTI) mapped from 5G-GUTI. The MME 316 may retrieve the WTRU's 390 MM and SM context from the NG CN 306. For connected-mode mobility from the NG CN 306 to the EPC 302, Inter-system handover may be performed.

A WTRU may (e.g., for idle-mode mobility from EPC to 5GC) perform a registration procedure with 5G-GUTI mapped from 4G-GUTI. The AMF 330 and SMF 334 may retrieve the WTRU's MM and SM context from the EPC 306. Inter-system handover may be performed, for example, for connected-mode mobility from the 302EPC to the NG CN 306.

In another embodiment, mobility may be supported in a dual-registration mode. Support may not be required for an NGx 376 interface between the AMF 330 in the NG CN 306 and the MME 316 in the EPC 302. During inter-system mobility from the NG CN 306 to the EPC 302, a WTRU 390 may perform attach in the EPC 302 with a handover indication in a PDN Connection Request message. The WTRU 390 may subsequently move its other PDU session using a WTRU-initiated PDN connection establishment procedure with a handover flag. The WTRU 390 may not continue to perform registrations in the NG CN 306 and may remain registered without PDU sessions in the NG CN 306, for example, until its registrations in the NG CN 306 timed out and the network performs implicit detach.

During inter-system mobility from the EPC 302 to the NG CN 306, a WTRU 390 may perform registration in the NG CN 306. The WTRU 390 may subsequently move its PDN connections from the EPC 302 using a WTRU-initiated PDU session establishment procedure with a handover flag. The WTRU 390 may not continue to perform TAU in EPC 302. The WTRU 390 may also remain attached without PDN connections in the EPC 302, for example, until the network performs implicit detach. A WTRU 390 that does not support attach without PDN connections in the EPC 302 may be detached in the EPC 302, for example, when the last PDN connection is moved to the NG CN 306.

In a 3GPP study of the mobility framework for the next generation core network, the level of mobility has been introduced to support mobility on demand requirements and save network resources by limiting mobility support to suit the devices. For example, the concepts of "mobility class" and "session class" have been introduced. A mobility class may describe the level of mobility support for a WTRU. The mobility class may be purely related to impact from mobility for a WTRU as if the WTRU would not have any PDU sessions; therefore, one mobility class per WTRU is needed. A session class may describe the level of mobility support for a PDU session of a WTRU. The session class may be related to impact from mobility for a WTRU taking only the PDU sessions into consideration. One session class per PDU session may be needed.

Examples given for mobility class may include: (i) unlimited (or high) mobility in which no or only minor restrictions are placed upon the allowed geographical area, for example, used by mobile broadband (MBB) users; (ii) low mobility in which the allowed geographical area is limited, for example, used for stationary subscribers and wherein the size may be limited to 1-5 tracking areas (TAs); and (iii) no mobility in which the allowed geographical area is limited, for example, used for users accessing the network only via a fixed point (having their own access network with possible mobility) and wherein the size may be limited to 1 TA.

Examples given for a session class may include: (i) session pre-setup in which mobility is supported with a pre-setup of a PDU session and session mobility (SM) resources may be established in advance on the target side, for example, equivalent to handover procedures; (ii) session post-setup in which mobility is supported with a post-setup of a PDU session and SM resources may be established after the WTRU has moved to the target side, for example, equivalent to cell re-selection/idle mode mobility procedures; and (iii) no PDU session in which no PDU session is allowed for the WTRU.

In another example, the level of mobility may include having an idle mode mobility (IMM) level and a connected mode mobility (CMM) level. The IMM may be a WTRU level attribute such as one IMM per WTRU, and may depend on the area where a WTRU roams. Examples of the IMM levels are: (i) Level 1, IDLE but not reachable; (ii) Level 2, Limited mobility (paged in fixed tracking areas); and (iii) Level 3, full mobility. The CMM may be a per-PDU-session attribute and may depend on whether the session is preserved. Examples of the CMM levels include: (i) mobility without session preservation; (ii) mobility with non-lossless session preservation; and (iii) mobility with lossless session preservation. For the above examples, it should be noted that whether the session continuity is supported or not may be the key factor to determine the per-PDU-session mobility level.

5G network systems may perform one of the following on per session basis for the same WTRU: (i) support session continuity; (ii) not support session continuity; and (iii) support service continuity when session continuity is not provided. Some issues are addressed herein. For example, an issue addressed herein is how a next generation system may determine the level of session continuity support for a new session. Another issue addressed herein is how the next generation system may apply one level of session continuity support for some sessions in a WTRU while applying a different level of session continuity for other sessions in the same WTRU.

A PDU session may be an association between a WTRU and a data network (DN). It may be similar to the concept of a Packet Data Network (PDN) connection used in EPC. There may be three types of PDU sessions: IP, Non-IP, and Ethernet. A PDU session of IP type may be an association between a WTRU and an IP data network. The PDU session is comparable to a single-stack PDN connection in Evolved Packet System (EPS) that comprises E-UTRAN and EPC. A dual-stack PDN connection in EPS may correspond to two PDU sessions.

Session continuity may mean the continuity of a PDU session. For PDU session of IP type, session continuity may imply that the IP address is preserved for the lifetime of the PDU session. The service continuity may mean an uninterrupted user experience of a service, including the cases where IP address and/or anchoring point changes.

A session in 5G network systems may be associated with three different service and session continuity (SSC) modes: SSC mode 1, SSC mode 2 and SSC mode 3. As used herein, the terminology SSC mode and SSC level may refer to the same concept and the terms are used interchangeably. In the SSC mode 1, the same user plane function (UPF) may be maintained regardless of the access technology (e.g., RATs and cells) that a WTRU is using to access the network. For example, a UPF that may be acting as a PDU session anchor at the establishment of a PDU session may be maintained during the lifetime of the PDU session. Internet protocol (IP) continuity may be supported, for example, regardless of WTRU mobility events.

In the SSC mode 2, the same UPF may be only maintained across a subset (i.e. one or more subsets, but not all subsets) of the access network attachment points (e.g., cells and RATs) which are referred to as the serving area of the UPF. When a WTRU leaves the serving area of a UPF, the WTRU may be served by a different UPF suitable for the WTRU's new point of attachment to the network. Specifically, a network may trigger the release of a PDU session and instruct the WTRU to (e.g., immediately) establish a new PDU session to the same data network. A new UPF acting as a PDU session anchor may be selected upon establishment of a new PDU Session. The SSC mode 2 may be referred to as a break-before-make type of PDU session In the SSC mode 3, a network may allow a WTRU to establish an additional PDU session to the same data network (DN) before a previous PDU session is eventually terminated. When the WTRU requests an additional PDU session, the network may select a target UPF suitable for the WTRU's new point of attachment to the network. While both PDU sessions are active, the WTRU may either actively rebind applications from the previous to the new PDU session or alternatively wait for flows bound to the previous PDU connection to the end. In other words, a network may allow the establishment of WTRU connectivity via a new PDU session anchor to the same DN before the previous connectivity between the WTRU and the previous PDU session anchor is released. The SSC mode 3 may be referred to as a make-before-break type of PDU session.

Figure 4:
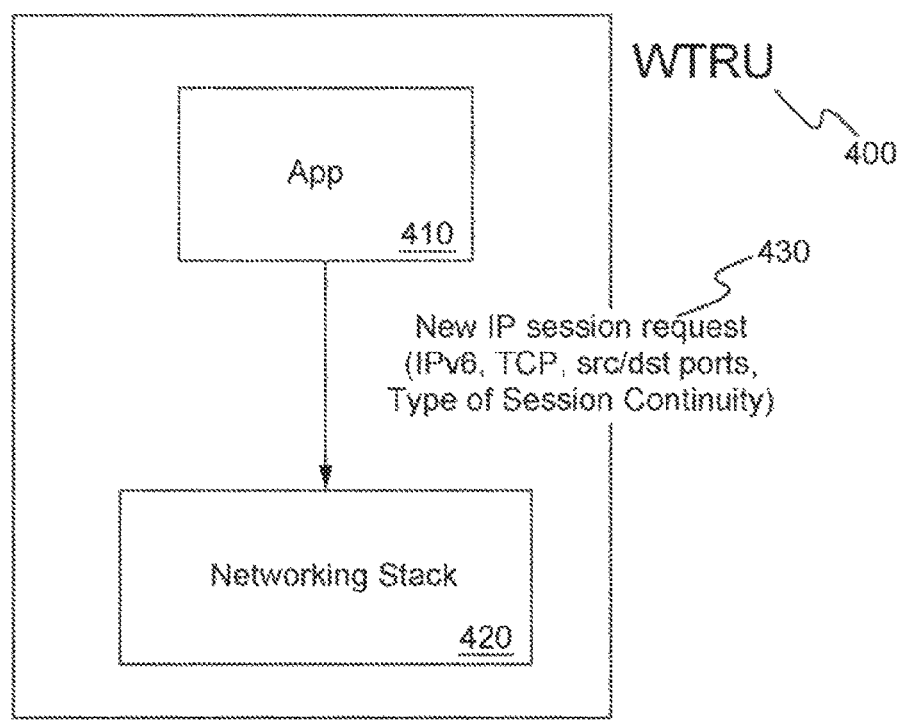
FIG. 4 is a diagram illustrating an example application that starts a new traffic flow with the indication of a session continuity type.

FIG. 4 illustrates an example application 410 that starts a new traffic flow with a type of session continuity. A WTRU 400 may determine the SSC mode required for the application 410. The application 410, then, may send a new IP request 430 to a networking stack 420 to start a new session. Specifically, the application 410 starting the new flow may open a new socket and indicate the type of session continuity required by this flow in the new IP session request 430. This may be indicated by using socket API extensions. (Further details of the socket API extensions are disclosed in RFC 3493, RFC 3542 and in draft-ietf-dmm-ondemand-mobility.) In other words, the application 410 may use already specified software APIs to indicate what type of session continuity is required. For example, if the application 410 requests a socket with a nomadic IP address (or non-persistent IP address), essentially, the application requests an SSC mode 2. This type of IP address provides neither IP session continuity nor IP address reachability.

If the application 410 requests a socket with a fixed IP address or a sustained IP address, essentially, the application 410 requests an SSC mode 1 or an SSC mode 3 respectively. The Fixed IP address is an address with a guarantee to be valid for a very long time. Fixed IP addresses are required by applications that need both IP session continuity and IP address reachability. A sustained IP address (or a session-lasting IP address) is an address with a guarantee to be valid throughout the IP session(s) for which it was requested. Session-lasting IP addresses are required by applications that need IP session continuity but do not need IP address reachability.

Figure 5:
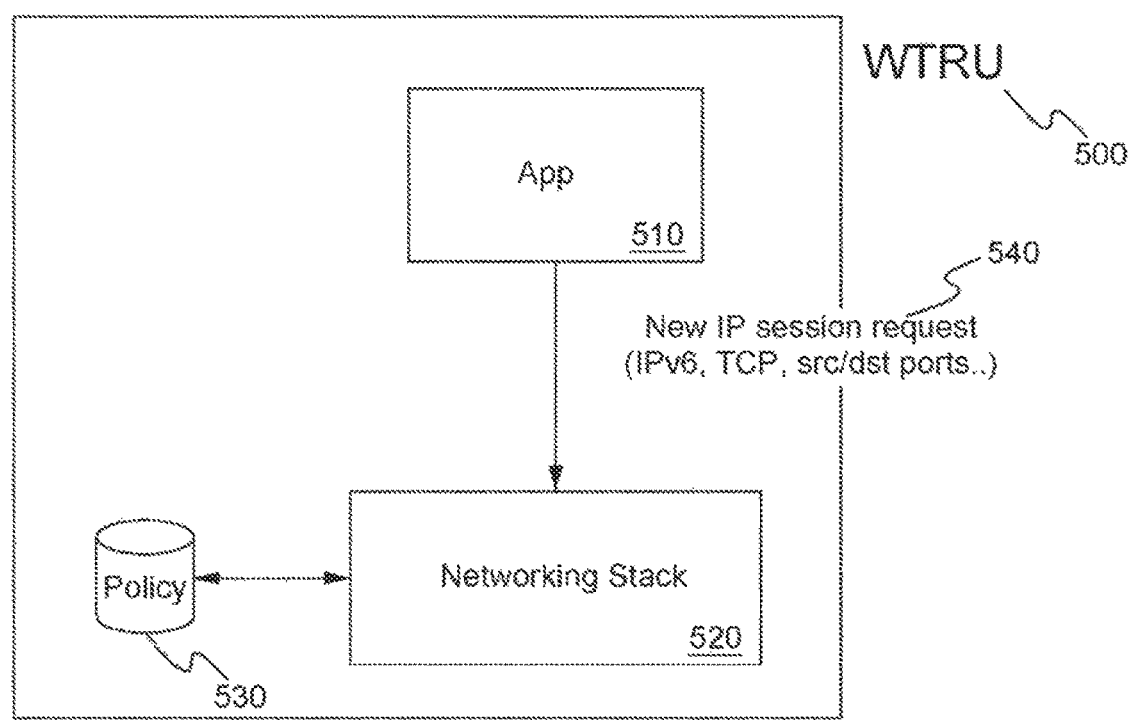
FIG. 5 is a diagram illustrating an example application that starts a new traffic flow without the indication of a session continuity type.

FIG. 5 illustrates an example application 510 that starts a new traffic flow without the indication of a session continuity type. If the application 510 that starts a flow does not indicate the type of required session continuity, a WTRU 500 may determine the required session continuity by using provisioned policy database, as shown in FIG. 5. For example, the application 510 may send a new IP session request 540 to a networking stack 530 without the indication of a session continuity type. The networking stack 520 may obtain a session continuity type from the policy database 530. Specifically, the policy database 530 may contain a list of prioritized rules and each rule may indicate the required SSC mode for entire applications or specific flow types. For example, the policy database 530 in the WTRU 500 may contain the following rules: (i) Rule 1, priority 1: App=com.example.skype, Required continuity type=SSC mode 3; (ii) Rule 2, priority 2: App=com.example.web-.server, Required continuity type=SSC mode 1; (iii) Rule 3, priority 3: Protocol=TCP; DstPort=80, Required continuity type=SSC mode 2; and (iv) Default rule: Default continuity type=SSC mode 2.

When a WTRU attempts to establish a PDU session before receiving a request from an application (e.g., during the initial attach, or the application does not request an SSC mode, or a WTRU does not have a policy for the specific application), the WTRU may not determine the SSC mode as described in FIGS. 4 and 5. In this case, if the WTRU is provisioned with a default SSC mode, for example, as part of the policy shown in FIG. 5, then the WTRU may request the PDU session with the default SSC mode. The default SSC mode may be one of the three SSC modes described above. For example, a fixed IoT sensor or even a smartphone may be provisioned with a default SSC mode 2. If the WTRU is not provisioned with the default SSC mode, then the WTRU may request a PDU session without providing the SSC mode. In this case, the network may determine the SSC mode of the PDU session, for example, based on subscription data and/or network policy, and may provide the selected mode back to the WTRU.

Figure 6:
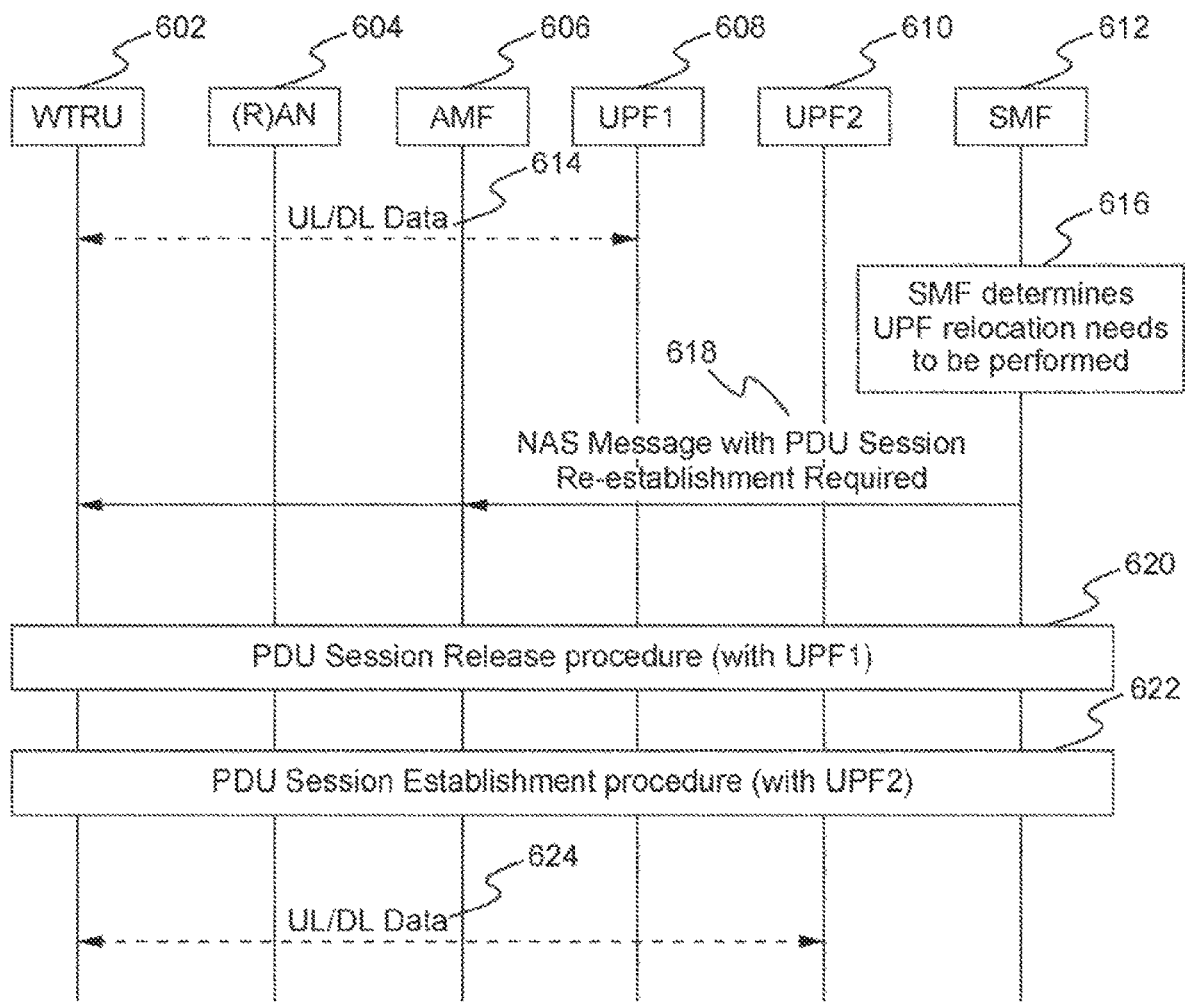
FIG. 6 is a signaling diagram which illustrates an example user plane function (UPF) relocation for a protocol data unit (PDU) session with Service Session Continuity (SSC) mode 2.

FIG. 6 is a signaling diagram which illustrates an example user plane function (UPF) relocation for a PDU session with an SSC mode 2. If a WTRU 602 has a PDU session with the SSC mode 2 and the WTRU 602 moves out of an area which the UPF1 608 of the current PDU session serves, a session mobility function (SMF) 612 may determine that UPF relocation needs to be performed at step 616. After that, the SMF 612 may transmit a NAS message with the PDU session re-establishment required at step 618 to the WTRU 602 via the AMF 606 and the (R)AN 604. Upon receiving the NAS message with the PDU session re-establishment required, at step 620, the WTRU 602 may initiate the PDU session release procedure with the SMF 612 and trigger the WTRU 602 to release the PDU session (hereinafter, the old PDU session). Then, the UL/DL data 614 connection with the UPF1 608 may be released. The WTRU 602 may initiate the PDU session establishment procedure with the SMF 612 at step 622 and (re-)establish a new PDU session (hereinafter, the new PDU session). The SMF 612 may select a UPF2 610 for the new PDU session after receiving the PDU session establishment request from the WTRU 602. After the new PDU session is established, the WTRU 602 may receive/transmit UL/DL data 624 from/to the UPF2 610.

Figure 7:
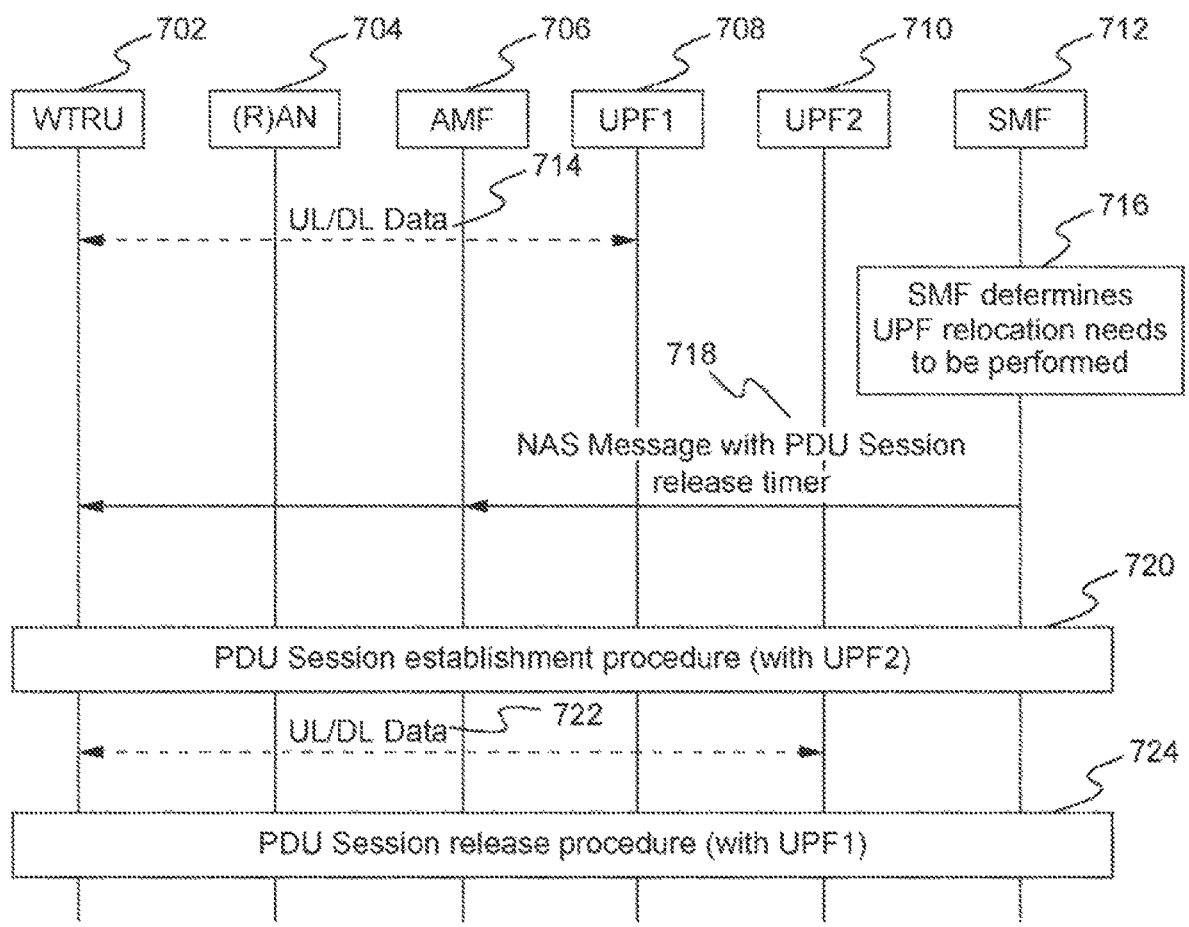
FIG. 7 is a signaling diagram which illustrates an example UPF relocation for a PDU session with SSC mode 3.

FIG. 7 is a signaling diagram which illustrates an example UPF relocation for a PDU session with an SSC mode 3. The signaling procedure described in FIG. 7 may be triggered by an SMF 712 in order to relocate a PDU session anchor serving a PDU session of the SSC mode 3 for a WTRU 702. This procedure may release the existing PDU session associated with an old PDU session anchor (i.e. UPF1 708) after having established a new PDU session to the same data network (DN) with the new PDU session anchor (i.e. UPF2 710), which is controlled by the same SMF 712. Specifically, if the WTRU 702 has a PDU session with the SSC mode 3 and the WTRU 702 moves out of an area which the UPF1 708 of the current PDU session serves, the SMF 712 may determine, at step 716, that UPF relocation needs to be performed. After determining the UPF relocation required, the SMF 712 may transmit a NAS message to the WTRU 702 with a PDU session release timer at step 718 via the AMF 706 and the (R)AN 704. In the NAS message, the SMF 712 may notify that the old PDU session of the WTRU 702 will be released in some time and offer a possibility to request a new PDU Session to the same DN. The NAS message may contain the existing PDU session ID and a timer value indicating how long the network is willing to maintain the existing PDU session.

Upon receiving the NAS message with the PDU session release timer, the WTRU 702 may initiate the PDU session establishment procedure with the SMF 712 at step 720. Specifically, the WTRU 702 may generate a new PDU Session ID and send a PDU Session Establishment Request to the SMF 712. The new PDU session ID may be included in N1 Session Management (SM) information. The old PDU session ID may be provided to the AMF 706 in the NAS message of the PDU Session Establishment Request. The AMF 706 may send the old PDU session ID with the N1 SM information to the SMF 712 in an N11 message. The SMF 712 may detect that the PDU session establishment request is related to the trigger in step 718 based on the old PDU session ID received from the AMF 706 and the presence of the new PDU session ID in the N1 SM information. The SMF 712 may store the new PDU session ID and select a new PDU session anchor (i.e. UPF2 710) for the new PDU session. The SMF 712 may provide the new PDU session ID to the AMF 706. The AMF 706 may store an association of the new PDU session ID and the SMF 712 ID for the new PDU session.

After having established the new PDU session to the same DN with the UPF2 710, the WTRU 702 may receive/transmit UL/DL data 624 from/to the UPF2 710. The old PDU session may be released in PDU session release procedure at step 724, either by the WTRU before the timer provided in step 718 expires (e.g., once the WTRU 702 has consolidated all traffic on PDU in the new PDU session or if the session is no more needed) or by the SMF 712 upon expiry of this timer. Then, the old PDU session with the UPF1 708 may be released and the UL/DL data 714 connection with the UPF1 708 may also be disconnected.

As described in FIGS. 6 and 7, during the PDU session establishment procedure, step 622 and step 720, the WTRU 602, 702 may assign a new PDU session ID for the PDU session and include the PDU session ID in the PDU session establishment request message. The AMF 606, 706 may determine that the WTRU's PDU session establishment request message corresponds to a request for the new PDU session based on the PDU Session ID that has not been used for any existing PDU Session(s) of the WTRU 602, 702.

When a WTRU moves from a EPC system to a 5G system, SSC mode handling may be provided. As described above, a PDU session in a 5G system may be associated with three different SSC modes. A PDU session may be the 5G equivalent/counterpart of a 4G PDN session. The terms PDN connection/session and PDU connection/session may be used interchangeably herein.

When a WTRU requests a PDU session, it may include a preferred SSC mode in a PDU connection request message to a 5G CN. The 5G CN may assign an SSC mode based on the WTRU request, subscription information and/or other policies (e.g., local policies). Thus, in a 5G system, an SSC mode may not be transparent to a WTRU. In an EPC system, however, a PDN may not have an SSC mode. An EPC network may decide to keep the same PGW for an entire PDN session (e.g., similar to SSC mode 1) or may trigger re-establishment to a new PGW, for example, when a WTRU moves to a different location (e.g., selected IP traffic offload (SIPTO) scenario that may be similar to the SSC mode 2). In either case, such actions may be network decisions that may be transparent to a WTRU and a PDN session itself may not be associated with a particular session continuity behavior.

An SSC mode may be associated with a session when the PDN session moves from an EPC system to a 5G system. WTRU behavior for such a scenario may be provided herein. For example, a WTRU that moves from a 5G system to an EPC system may be registered without a PDU session. This means that the WTRU in the 5G system may be registered to the 5G network without having a data session with the network. In this case, the WTRU may perform a registration procedure without the PDU session establishment procedure. However, a WTRU may not be registered or attached without a PDN session in an EPC system except that the EPC system supports Cellular-Internet of Things (CIoT) optimization. When the EPC system supports the CIoT optimization which is an optional feature in the EPC, the WTRU may be able to attach without a PDN connection to the EPC system. Otherwise, the WTRU connected to the EPC system that does not support the CIoT optimization may need to have at least one active PDN session. Thus, when a WTRU registers without a PDU session in a 5G system and performs inter-system change to the EPC that does not support the CIoT optimization, the WTRU may need to take certain actions to ensure smooth transition.

A WTRU connected to a 5G CN may have a multi-homed PDU session. The WTRU in a multi-homed PDU session may have simultaneous connections to two different UPF anchors or user plane gateways (UP-GW) anchors. Each UPF anchor may assign different source IP addresses to the WTRU. Thus, the WTRU may be assigned two different IP addresses for one multi-homed PDU session. It should be noted that a multi-homed PDU session may apply to an IPv6 type of PDU session. However, an EPC system may not support a multi-homed PDN connection. A PDU session in the EPC system may be referred to as a PDN session. The PDN session in the EPC system may be an end to end connection between a WTRU and a PGW. Thus, the WTRU may connect to the single PGW for a particular PDN session and may have one source IPv6 prefix assigned to it.

When a WTRU performs an inter-system change from a 5G system to an EPC system, all the sessions of the WTRU may need to be moved to the EPC system to maintain seamless connectivity. If the WTRU has a multi-homed PDU session in a 5G system, that multi-homed PDU session may also need to be handed over to the EPC system. Details of transfer of such multi-homed PDU session and corresponding WTRU behavior to maintain seamless connectivity upon inter-system transfer may be provided herein.

In a 5G network system, when a PDU session is established, a WTRU and a 5G CN should determine the proper initial SSC mode to be applied to the PDU session. When a service or application is launched, the WTRU and the 5G CN needs to make sure that the PDU session used to carry the service or application needs to guarantee the SSC mode that the service or application requires.

It is possible that during the life of a PDU session, the 5G CN determines that the SSC mode initially or later assigned to the PDU session does not best serve the type of traffic going over that particular PDU session. Such a scenario needs to be handled by various network nodes in terms of both detection of a change in the SSC mode and taking the corresponding actions. Such details may be provided herein.

A WTRU may have at least two PDN sessions such that one of them provides session continuity (e.g., IP address preservation) and the other does not. Due to an application layer needs, which may be subject to a different charging rate, the flows of one application may undergo a change of SSC mode. In other words, a particular flow that is handled by an SSC mode 1 where the SSC mode 1 does not provide IP address preservation may not be moved to a PDN session that is handled by an SSC mode 2 where, after the switch, the SSC mode 2 provides IP address preservation. Details of updating flows from one SSC mode to another SSC mode may be provided herein.

The choice of the SSC mode for a PDU session may impact a few things in establishment of the user plane path for the PDU session, such as the selection of IP anchor gateways. It may also have impact on how a RAN would prepare and handle a handover procedure. For example, if a PDU session does not require session continuity, a tightly controlled lossless handover procedure may be replaced by a loosely controlled or even WTRU autonomous handover. In this regard, the RAN may need to be aware of the SSC mode(s) of the WTRU's PDU sessions so that the WTRU may make an efficient configuration for user plane handling and handover control.

An AMF may perform an SMF selection during the PDU session establishment procedure, according to Data Network Name (DNN), SMF load conditions, or the like. This means that the AMF may select a new SMF for a new PDU session which is different from the SMF serving the old PDU session. This may be the case described in FIG. 6 that the WTRU 602 sends a PDU session establishment request to the SMF at step 622 based on the PDU session re-establishment request received from the SMF at step 618. This may cause related PDU sessions, including the new PDU session and the old PDU session of the WTRU, to be controlled by a separate network element. The SMF serving the old PDU session may not be capable of ensuring whether the related new PDU session has been successfully established. Because of this, the SMF serving the old PDU session may be unable to determine whether or not to release the old PDU session of the WTRU.

Figure 8:
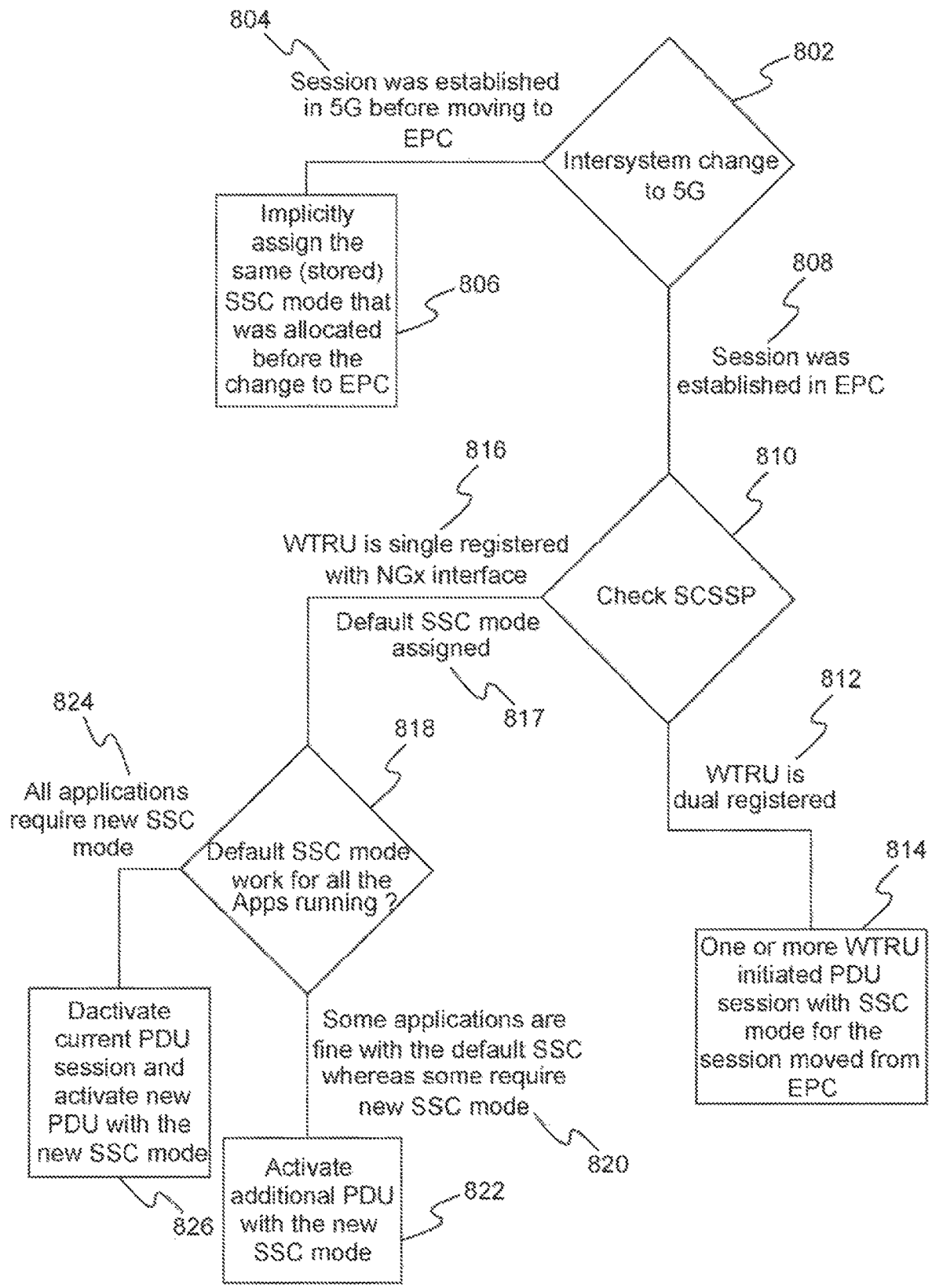
FIG. 8 is a flow diagram which illustrates an example of WTRU behavior for SSC mode handling upon inter-system change from an EPC system to a 5G system.

FIG. 8 illustrates an example of WTRU behavior for SSC mode handling upon inter-system change from an EPC system to a 5G system. When a WTRU performs an inter-system change from an EPC system to a 5G system at step 802, the WTRU may perform a check for each PDU session whether the session was initially established in the 5G system or the EPC system. If the session was first established in the 5G system before the WTRU moved to the EPC system at step 804, the WTRU may have stored the SSC mode upon moving to the EPC system for such a PDU session. When the same session is relocated back to the 5G system, the WTRU may implicitly assign a previously stored SSC mode to that PDU session at step 806. The WTRU may determine, based on the source IP, whether a session was originally established in the 5G system or may already have a stored SSC value. The WTRU may have a mapping of SSC modes to source IP addresses. Thus, the WTRU may check whether there is an SSC mode for a source IP address upon an inter-system change from the EPC to the 5G system. If an SSC mode exists, the WTRU may apply the SSC mode to a PDU session in the 5G system.

When a session being moved to the 5G system may have been established in the EPC system at step 808 or the WTRU may not have a stored SSC mode for the session, upon inter-system change, the WTRU may check its policy such as SSC selection policy (SSCSP) at step 810 to determine whether applications running over the session may require one or more SSC modes. If the applications require one or more SSC modes, this example scenario may be sub-categorized, for example, in two different cases, such as (i) where a WTRU may be dual registered at step 812 and (ii) where a WTRU may be single registered and a network supports an NGx interface at step 816.

The dual registered WTRU may perform a WTRU initiated PDU connection request, for example, when it moves from the EPC system to the 5G system to transfer its session from the EPC system. The dual registered WTRU may check a policy (e.g., SSCSP). The WTRU may send multiple WTRU initiated PDU connection requests to the 5G core network with different SSC modes, for example, when the dual registered WTRU determines that multiple SSC modes may be required for a session active in the EPC system. At step 814, the WTRU may activate multiple PDU sessions with SSC modes for a single PDN session transferred from the EPC system.

If the WTRU is single registered and the network supports an NGx (or Nx) interface at step 816, a session may be transferred to the 5G system, for example, when the WTRU sends a registration message (e.g., similar to tracking Area update in EPC) upon relocating to the 5G system or performs an inter-system handover to the 5G system. In other words, the WTRU may not have to initiate a session transfer. The WTRU may initially consider a transferred session which was established in the EPC system may have a default SSC mode (e.g., SSC mode 1 or SSC mode 2) at step 817.

At step 818, the WTRU may determine, based on the SSCSP check and applications transferring data on the session, whether a default SSC mode fits service continuity criteria for the applications. In an embodiment, all the applications using the session may prefer a different SSC mode, for example SSC mode 3, at step 824. At step 826, the WTRU may deactivate or tear down a transferred PDU session and may activate a new PDU session with a preferred SSC mode. In an example, some (not all) applications transmitting data on a PDU session may require a different SSC mode at step 820. The WTRU may keep a transferred PDU session and may activate a new PDU session with a different SSC mode at step 822. The WTRU may perform these actions for one or more sessions (e.g., PDN sessions) that may be transferred from the EPC system to the 5G system.

Figure 9:
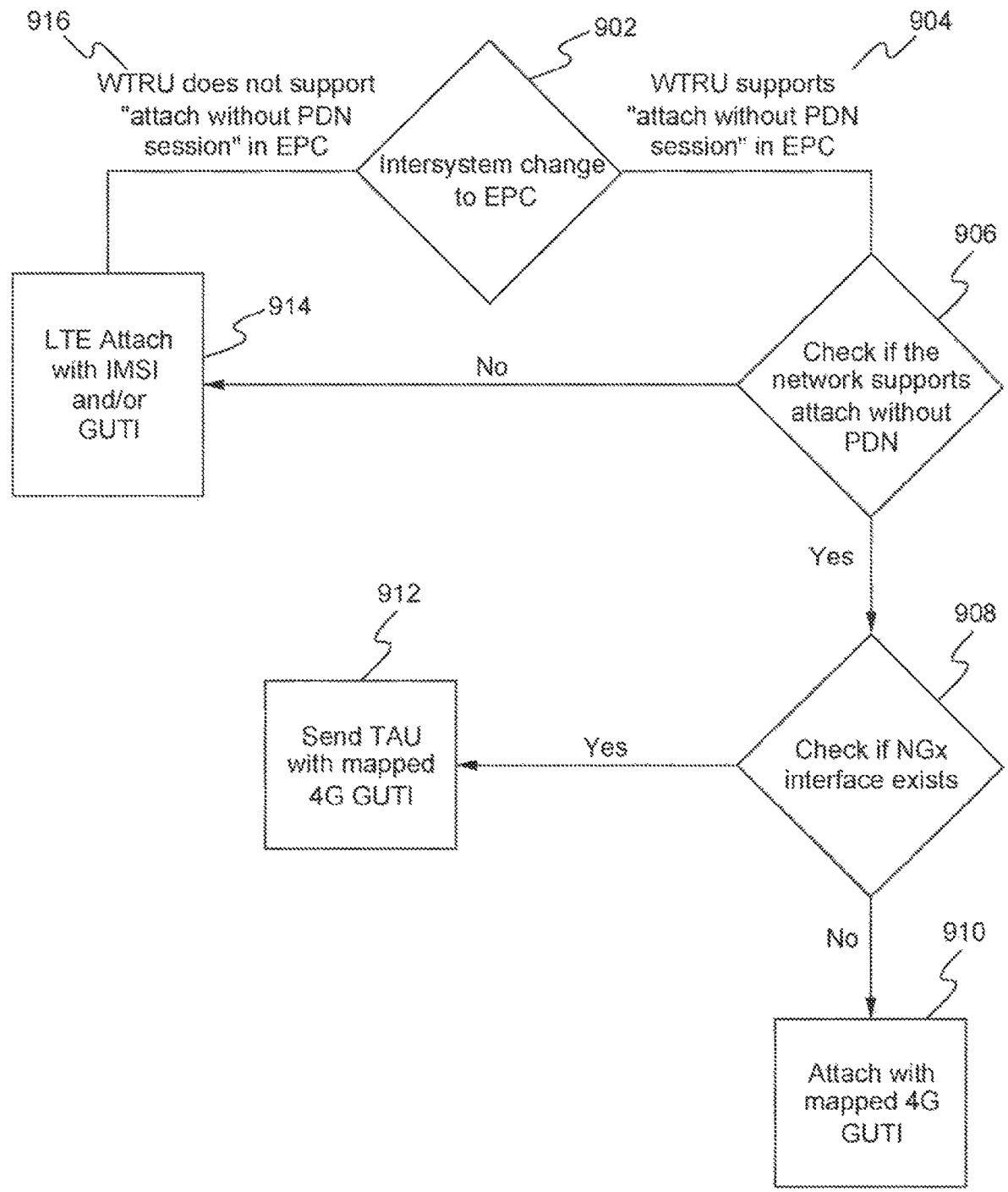
FIG. 9 is a flow diagram which illustrates an example of WTRU behavior for a WTRU registered without a PDU session upon inter-system change from a 5G system to an EPC system.

FIG. 9 illustrates an example of WTRU behavior upon inter-system change from a 5G system to an EPC system for a WTRU registered without a PDU session. At step 902, the WTRU registered without a PDU session in the 5G sytem may perform an inter-system change to the EPC system for both connected mode handover and idle mode reselection. The WTRU may perform different steps to ensure smooth transition to the EPC system, for example, based on whether the WTRU does or does not support attach with the PDN session in the EPC system.

If the WTRU support attach without a PDN session at step 904, the WTRU may first check whether the EPC system supports attach without PDN session during or upon inter-system change to the EPC system. Specifically, the WTRU may read broadcast information (e.g., system information blocks (SIBs) broadcasting support for CIoT control plane optimizations) to make this determination. If the EPC system supports attach without PDU session at step 906 and there is support for an NGx interface between an MME and an AMF at step 908, the WTRU may send a tracking area update (TAU) request to an MME at step 912. The TAU request may include a WTRU preferred behavior information element (IE), which may indicate that the WTRU supports/prefers attach without a PDN session in LTE. A temporary ID included in the tracking area request message may be a 4G-GUTI mapped from a 5G-GUTI with an indication that the ID is a mapped GUTI.

If the NGx interface is not supported at step 908, the WTRU may send an attach message at step 910, that include a handover indication. The WTRU may include a preferred network behavior IE in the attach request message that indicates support for attach without a PDN session. A temporary ID included in the attach message may be the mapped GUTI with an indication informing the MME that the ID may be included in a mapped ID. It should be noted that when an EPC system does not support attach without a PDN session, a WTRU may behave as though it does not support attach without a PDN session.

If a WTRU may not support attach without a PDN session at step 916, the WTRU may send an attach request with an Evolved Packet System Session Management (ESM) container at step 914. The attach request may establish a PDN session on the LTE side. Generally, WTRU behavior upon inter-system change may involve performing a TAU procedure. However, the WTRU may skip the TAU procedure because it would be rejected by the network. Instead, the WTRU may directly perform an attach procedure in the EPC system. The WTRU may include an International Mobile Subscriber Identity (IMSI) as a temporary ID in the attach request message when it does not have a 4G-GUTI assigned previously by the MME. If the WTRU has an old 4G-GUTI, it may include the old 4G-GUTI or an IMSI and the 4G-GUTI in the attach request message. The mapped GUTI may not be necessary because there may not be a need for context transfer from the AMF to the MME.

In an embodiment, a multi-homed PDU session may be switched from a 5G system to an EPC system. Inter-system change from the 5G system to the EPC system may mean that all WTRU data sessions may be moved to the EPC system. A WTRU may perform a handover to the EPC system if it is in connected mode. The WTRU may send a NAS registration message such as attach or TAU message to the EPC system if the WTRU is in idle mode. In either case, a PDU session in a core network may be transferred to the EPC system based on interaction between an MME in the EPC and an AMF in the 5G CN. The WTRU may receive a confirmation of transfer of PDN connections upon completion of the handover (e.g., in a connected mode case) or in a registration accept message (e.g., in an idle mode case). If the WTRU is dual registered to the EPC system and the 5G system at the time of inter-system change, the WTRU may perform a WTRU initiated PDN connection request after an inter-system change to transfer PDU sessions to the EPC system.

As described above, a multi-homed PDU session may be transitioned from a 5G system to an EPC system as a PDN session with an anchor PGW. The PDN session may be associated with one of IPv6 prefixes previously used in the 5G system for this multi-homed PDU session. Thus, the WTRU may need to determine which of two IPv6 prefixes correspond to a PDN session in the transferred PDN session in the EPC system based on one or more of the following examples:

In an example to determine an IPv6 prefix, a WTRU may receive new traffic flow templates (TFTs) and packet filters from an EPC system (e.g., after the PDN may be moved to the new system). The TFT/packet filters may be part of a session management NAS message (e.g., bearer modification message or dedicated bearer activation message). A source IP address in the packet filters for a previously multi-homed PDN session may indicate to the WTRU the IPv6 prefix being used for the PDN connection on the EPC side. In another example to determine an IPv6 prefix, for a WTRU initiated PDN connection request procedure in a dual registered case, a WTRU may receive a previously assigned IPv6 prefix (e.g., referred to as a first IPv6 prefix) from the EPC network in the PDN connection accept message.

The WTRU may then determine whether to keep the other IPv6 prefix (e.g., referred to as a second IPv6 prefix). The WTRU may discard the second IPv6 prefix if it is for a multi-homed PDU session of SSC mode 3. It is because the EPC system does not support a make-before-break PDN session continuity (i.e. SSC mode 3). The WTRU may also remove the second IPv6 prefix when the IPv6 prefix was associated with a local network and the WTRU may have moved out of coverage of the local network.

In some embodiments, the WTRU may store the second IPv6 address and use it to transfer application data. When the WTRU keeps the second IPv6 prefix, the WTRU may take one or more of the following actions to establish a session for the kept second IPv6 prefix to enable applications to continue using the second prefix. Alternatively, the WTRU may keep all IPv6 prefixes available when the WTRU with multi-homing PDU session moves to LTE, except that the WTRU receives router advertisement (RA) from the EPC network to update a related IPv6 prefix.

In order to establish a PDN session in the EPC system, the WTRU may send a PDN connection request message to an MME in the EPC system. The PDN connection request message may include the same access point name (APN) as the multi-homed PDU session in the 5G system. This may enable the MME to select the same PGW as the PDN connection using the first IPv6 prefix. Furthermore, if the multi-homed PDU session may have been enabled for connection with a local data network, the PDN connection request may include the name of the data network (e.g., local APN).

The WTRU may further include an indication in a protocol configuration option (PCO) part of a static IP address that may be assigned for a PDN session. Alternatively, the WTRU may signal in the PCO that the WTRU may require IP assignment based on a router advertisement (RA) procedure. The WTRU may send the second IP prefix in the RA message to the PGW after the establishment of the PDN session.

The WTRU may activate a dedicated bearer corresponding to the PDN connection with the second IPv6 prefix. The first and second IPv6 prefixes may be associated with an IP interface (i.e. at the IP layer in the application processor) leading to default and dedicated bearers. The traffic from the second IPv6 prefix may be routed using TFTs through the dedicated bearer (i.e. inside the modem).

Network slicing is a key feature of the 5G system and an enabler for providing different services and meeting different service requirement. The network slicing may be performed by grouping different network entities into a network slice instance (NSI) to implement shared network functions (e.g., control plane (CP) functions) and dedicated network functions (e.g., user plane (UP) functions). In a sliced network, a WTRU's PDU sessions may be established towards specific network slice instances (NSIs) and each PDU session may be carried in at most one NSI but not across multiple NSIs. Each NSI may have its specific support for certain SSC modes. The CP and UP nodes within a NSI may be configured to fulfill the supported SSC mode. For example, one NSI may support lossless session continuity while the other NSI may not support session continuity. It is also possible that a NSI may support various SSC modes simultaneously. Thus, a PDU session that is of a specific SSC mode may be established in a NSI that supports that specific SSC mode.

Figure 10:
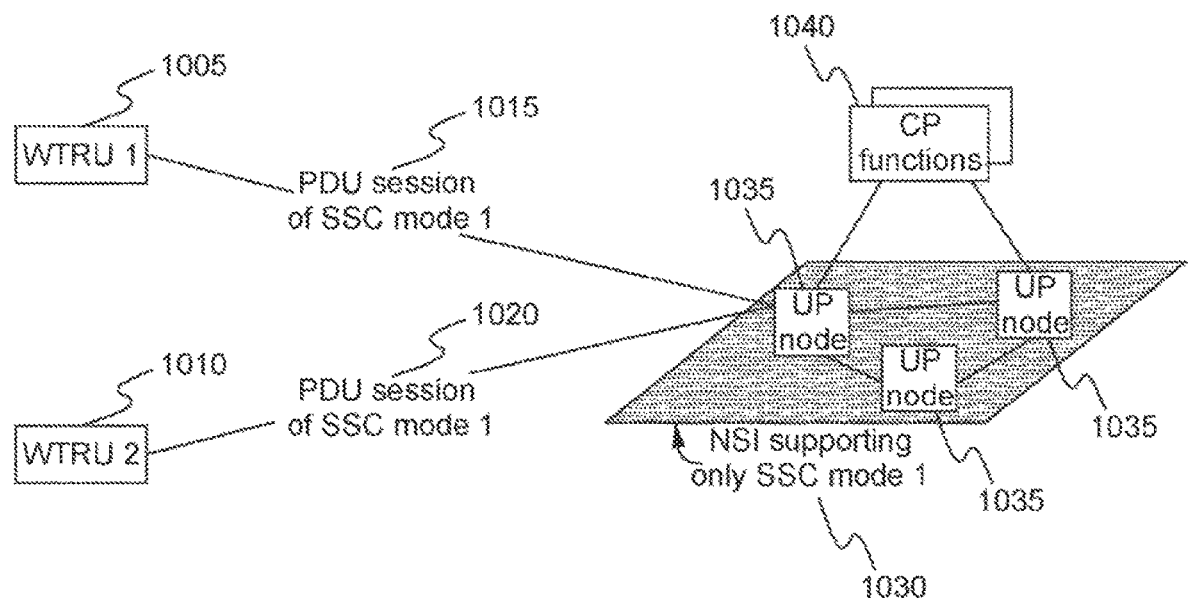
FIG. 10 is a diagram illustrating an example scenario wherein a network slice instance (NSI) supports one unique SSC mode.

FIG. 10 illustrates an example scenario wherein a NSI 1030 supports one unique SSC mode. As shown in FIG. 10, the NSI 1030 may include CP functions 1040 and UP nodes 1035. Because the NSI 1030 can support only one SSC mode in this example, the UP node 1035 may provide a single SSC mode to each of the WTRUs 1005, 1010. For example, the WTRU 1 1005 may have a PDU session of SSC mode 1 1015 with the UP node 1035. Similarly, the WTRU 2 1010 have a PDU session of SSC mode 1 with the UP node 1035. In this scenario, an SSC mode for the to-be-established PDU session may be implicitly determined when the NSI 1030 is selected for the PDU session. The desired SSC mode for the PDU session may also be considered when the NSI 1030 is selected.

Figure 11:
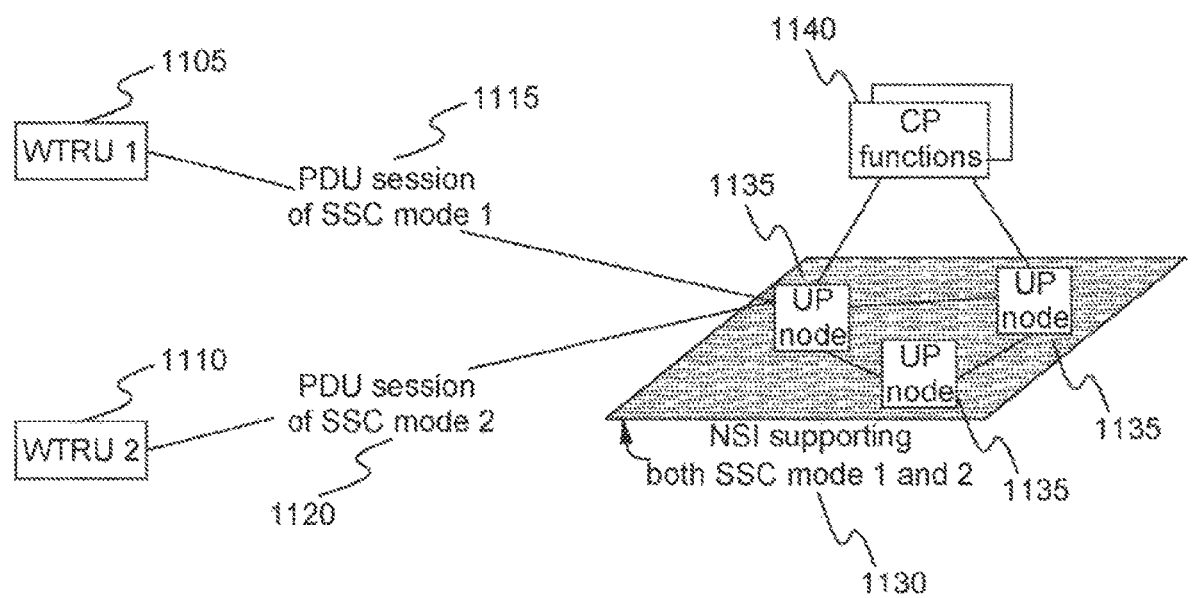
FIG. 11 is a diagram illustrating an another example scenario wherein a NSI supports multiple SSC modes.

FIG. 11 illustrates an example scenario wherein a NSI supports multiple SSC modes. As shown in FIG. 11, the NSI 1130 may include CP functions 1140 and UP nodes 1135. Because the NSI 1130 can support multiple SSC modes, the UP node 1135 may provide multiple PDU sessions to each of the WTRUs 1105, 1110. For example, the WTRU 1 1105 may have a PDU sessions of SSC mode 1 1115, but the WTRU 2 1110 may have a PDU session of SSC mode 2 1120. In this scenario, the desired SSC mode for the PDU session may also be considered when the NSI 1130 is selected. In addition, more procedures and configurations may be needed to guarantee that the desired SSC level for a PDU session is accommodated.

Figure 12:
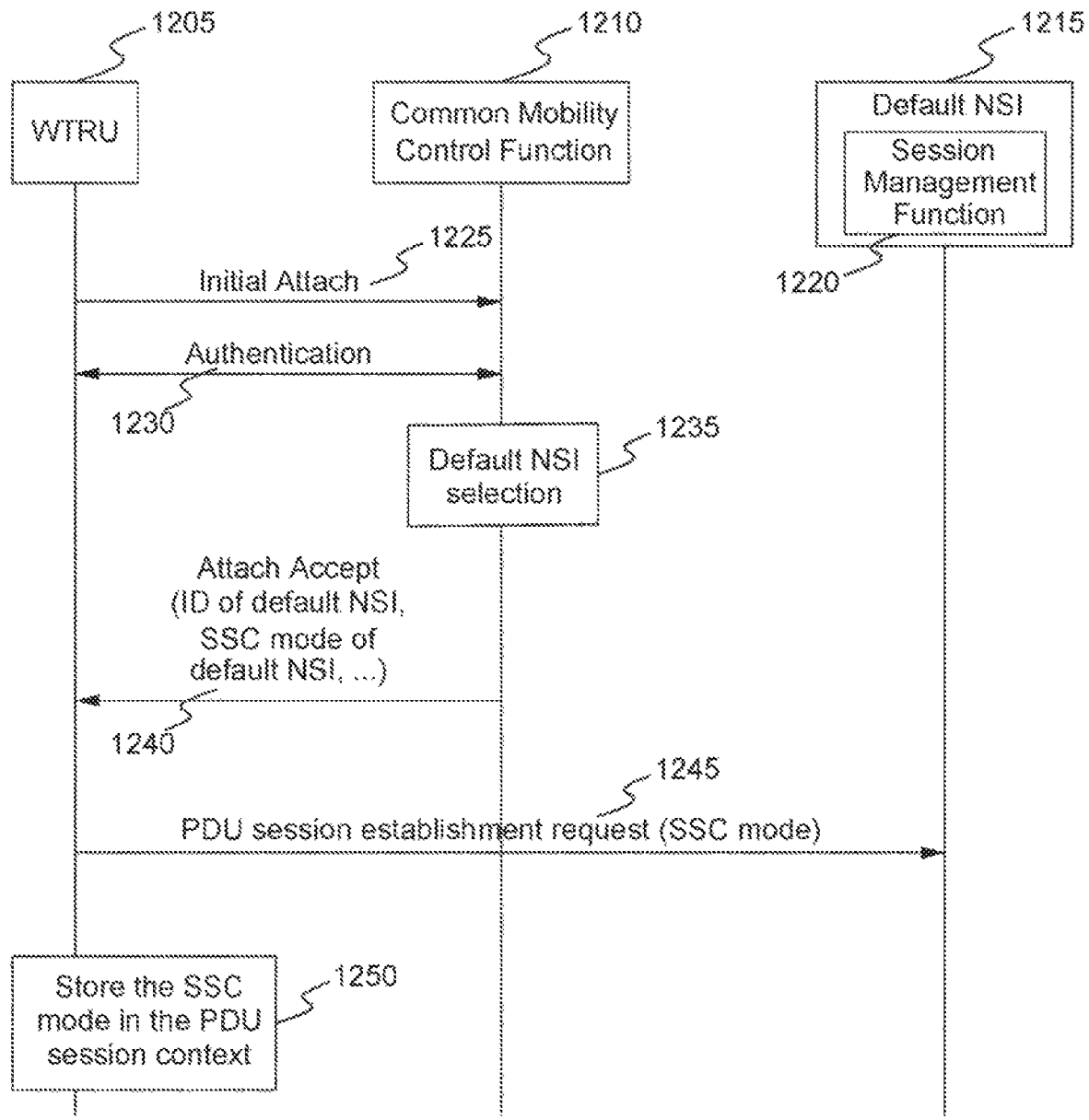
FIG. 12 is a signaling diagram which illustrates directly assigning the SSC mode of NSI as the SSC mode of PDU session.

FIG. 12 is a signaling diagram which illustrates directly assigning the SSC mode of NSI as the SSC mode of PDU session. As shown in FIG. 12, at step 1225, a WTRU 1205 may initially attach to a 5G network via common mobility control function 1210. If the WTRU 1205 is successfully authenticated by the common mobility control function 1210 at step 1230, the common mobility control function 1210 may determine a default NSI 1215 for the WTRU 1205 at step 1235. This default NSI selection may be determined based on a few factors such as the WTRU subscription data, WTRU's service type, WTRU's mobility characteristics and requirement, or the like. The default NSI selection at step 1235 may be performed by WTRU autonomous selection or controlled by the network.

At step 1240, the WTRU 1205 may receive SSC mode(s) supported by the default NSI 1215 via an attach acceptance message during the initial attach/registration procedure. Specifically, the common mobility control function 1210 which handles the attach/registration and slice selection may select the default NSI 1215 for the WTRU 1205 and return the selected NSI information such as NSI identifier and its supported SSC modes to the WTRU 1205. The common mobility control function 1210 may not only provide the supported SSC modes of the selected NSI (i.e. default NSI 1215), but also provide supported SSC modes of other NSIs which the WTRU 1205 can potentially use.

In an embodiment, the default NSI 1215 or other NSI(s) may broadcast its supported SSC modes to the WTRU 1205 or neighboring WTRUs as part of the network slice information. The WTRU 1205 may acquire the broadcasted slice information during a slice discovery procedure and store the slice information including its supported SSC modes.

After the WTRU 1205 is attached to the network, the WTRU 1205 may send a PDU session establishment request to a Session Management Function (SMF) 1220 at step 1245 to establish a PDU session. The default PDU session may also be established, either during the initial attach and default NSI selection procedure or shortly after the initial attach and default NSI selection procedure. With the default session establishment, the WTRU 1205 may store the SSC mode that the default NSI 1215 supports in the PDU session context at step 1250. The WTRU 1205 may also store the SSC mode in the context of the default NSI 1215.

When the WTRU 1205 initiates a default PDU session establishment procedure towards the selected default NSI 1215, the common mobility control function 1210 that handles the session management within the NSI 1215 may return the supported SSC mode information in the session management messages to the WTRU 1205. If the selected default NSI 1215 supports one single SSC, the supported SSC of the NSI 1215 may be implicitly assigned as the SSC mode of the established default PDU session, at both WTRU 1205 side and network side. The WTRU 1205 and the network may store the SSC-mode information in the context of the default PDU session.

Figure 13:
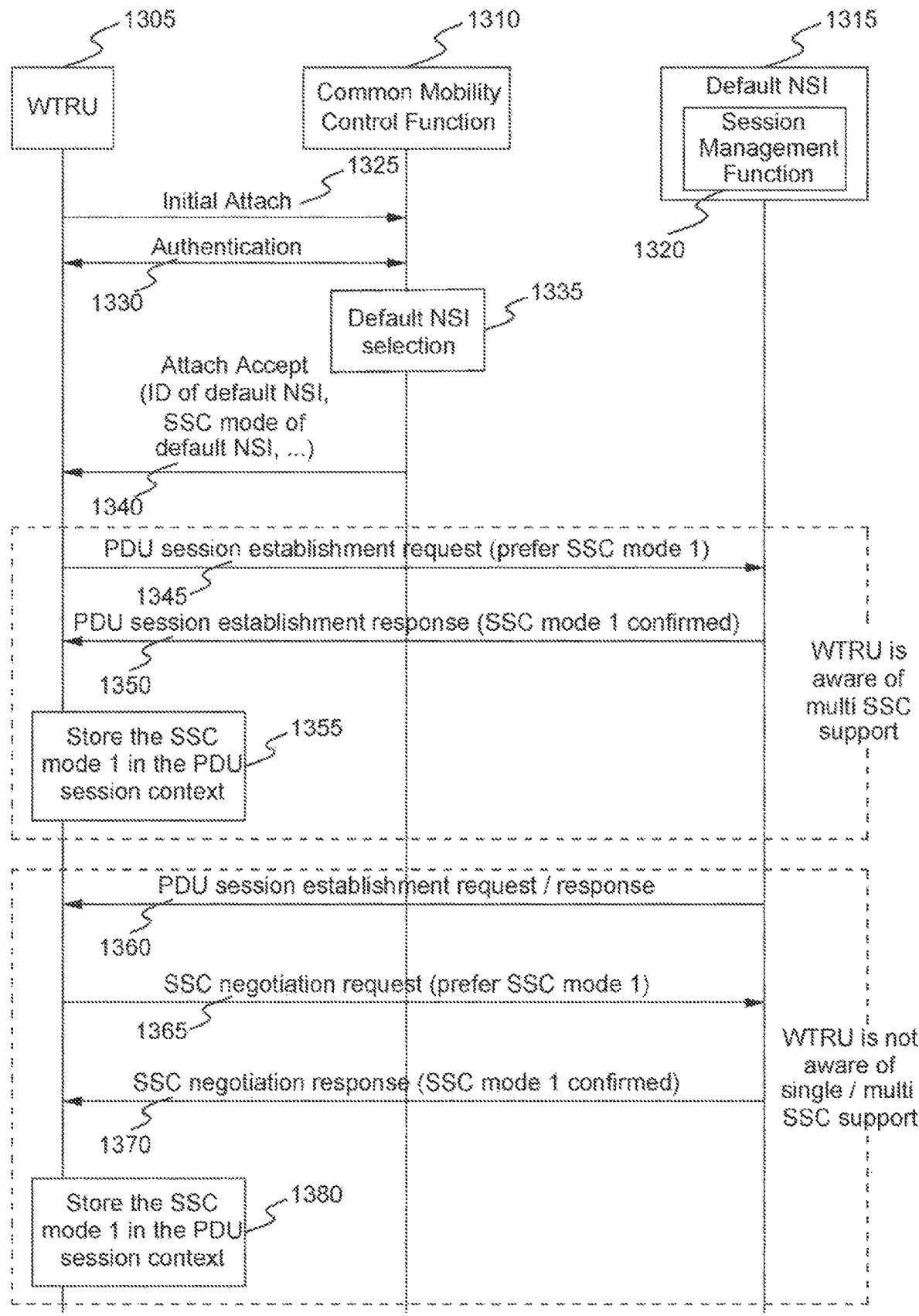
FIG. 13 is a signaling diagram which illustrates SSC mode negotiation during or after PDU session establishment.

FIG. 13 is a signaling diagram which illustrates SSC mode negotiation during or after PDU session establishment. As shown in FIG. 13, at step 1325, a WTRU 1305 may initially attach to a 5G network via a common mobility control function 1310. If the WTRU 1305 is successfully authenticated by the common mobility control function 1310 at step 1330, the common mobility control function 1310 may determine a default NSI 1315 for the WTRU 1305 at step 1335. At step 1340, the WTRU 1305 may receive SSC mode(s) supported by the default NSI 1315 via an attach acceptance message during the initial attach/registration procedure. If the selected NSI (i.e. default NSI 1315) supports multiple SSC modes, the attach acceptance message may include the multiple SSC modes supported by the default NSI 315. For example, the attach acceptance message includes an ID of default NIS 1315 and SSC modes 1 and 2 as the supported SSC modes.

In an embodiment, the default NSI 1315 or other NSI(s) may broadcast supported multiple SSC modes to the WTRU 1305 or neighboring WTRUs as part of the network slice information. The WTRU 1205 may acquire the broadcasted slice information during a slice discovery procedure and store the slice information with supported multiple SSC modes.

If the selected NSI (i.e. default NSI 1315) supports multiple SSC modes and the WTRU 1305 is aware of that fact before the PDU session establishment is initiated, at step 1345, the WTRU 1305 may indicate in the PDU session establishment request a preferred SSC mode. The PDU session establishment request may also include other information such as a service type that may be used by the network to deduce the proper SSC mode for the PDU session. In an embodiment, based on the WTRU 1305 input and some network side information such as user subscription data and local policy, the SMF 1320 may choose one SSC mode from its supported SSC modes and assign it to the PDU session. At step 1350, the SMF 1320 may send a PDU session establishment response with the selected SSC mode, thereby informing the WTRU 1305 that the SSC mode 1 is confirmed as an example. After a default PDU session is established, the WTRU 1305 may store the selected SSC mode in the PDU session context at step 1355 or in the context of the default NSI 1315.

If the selected NSI (i.e. default NSI 1315) supports multiple SSC levels but the WTRU 1305 is not aware whether a single or multiple SSC levels are supported by the default NSI 1315 before the PDU session establishment is initiated, the WTRU 1305 may still indicate its preferred SSC mode and rely on the network to assign the proper SSC mode as described above. Alternatively, during the PDU session establishment request/response at step 1360, the WTRU 1305 may not indicate the preferred SSC mode or other related information in the PDU session establishment. However, after the WTRU 1305 received the supported SSC mode information in the PDU session establishment response message, the WTRU 1305 may initiate further SSC mode negotiation procedure with the default NSI 1315. Specifically, at step 1365, the WTRU 1305 may send an SSC negotiation request message that includes a preferred SSC mode (e.g., SSC mode 1) and/or related info to the default NSI 1315. Upon receiving the preferred SSC mode, the default NSI 1315 may determine whether the default NSI 1315 supports the SSC mode or not. If the default NSI 1315 supports the SSC mode, the default NSI 1315 may send an SSC negotiation response back to the WTRU 105 at step 1370. The SSC negotiation response may include a confirmation that the SSC mode 1 is assigned to the PDU session requested by the WTRU 1305. After that, the WTRU 1305 and the network may store the SSC-mode information in the context of the default PDU session at step 1380.

In an embodiment, a WTRU may be pre-configured with a plurality of NSIs that it may use. Each of the plurality of NSIs may be pre-configured with a set of supported SSC modes. When the WTRU intends to establish a PDU session in one of the pre-configured NSIs, the WTRU may only choose a preferred SSC mode from the set of SSC modes supported by the target NSI. The pre-configured set of SSC modes which may be supported by the potential NSI may be used when the WTRU is registered to a home network. When the WTRU is roaming in a visitor network, the WTRU may need to obtain the slice-supported SSC modes from the serving network via the procedures described above.

In another embodiment, a WTRU may autonomously choose one of the SSC modes as the SSC mode of the default PDU session according to the local configuration or the dominant service type in the WTRU. For example, if: (i) a default NSI is chosen for a machine type communication (MTC) device; (2) the NSI supports both lossless-session-continuity and no-session-continuity; and (3) the MTC device determines that the potential MTC service does not require session continuity, then the WTRU may choose to assign the no-session-continuity as the SSC of the PDU session. After the WTRU has determined the SSC mode of the PDU session, the device may inform the network this decision via proper session management messages.

Figure 14:
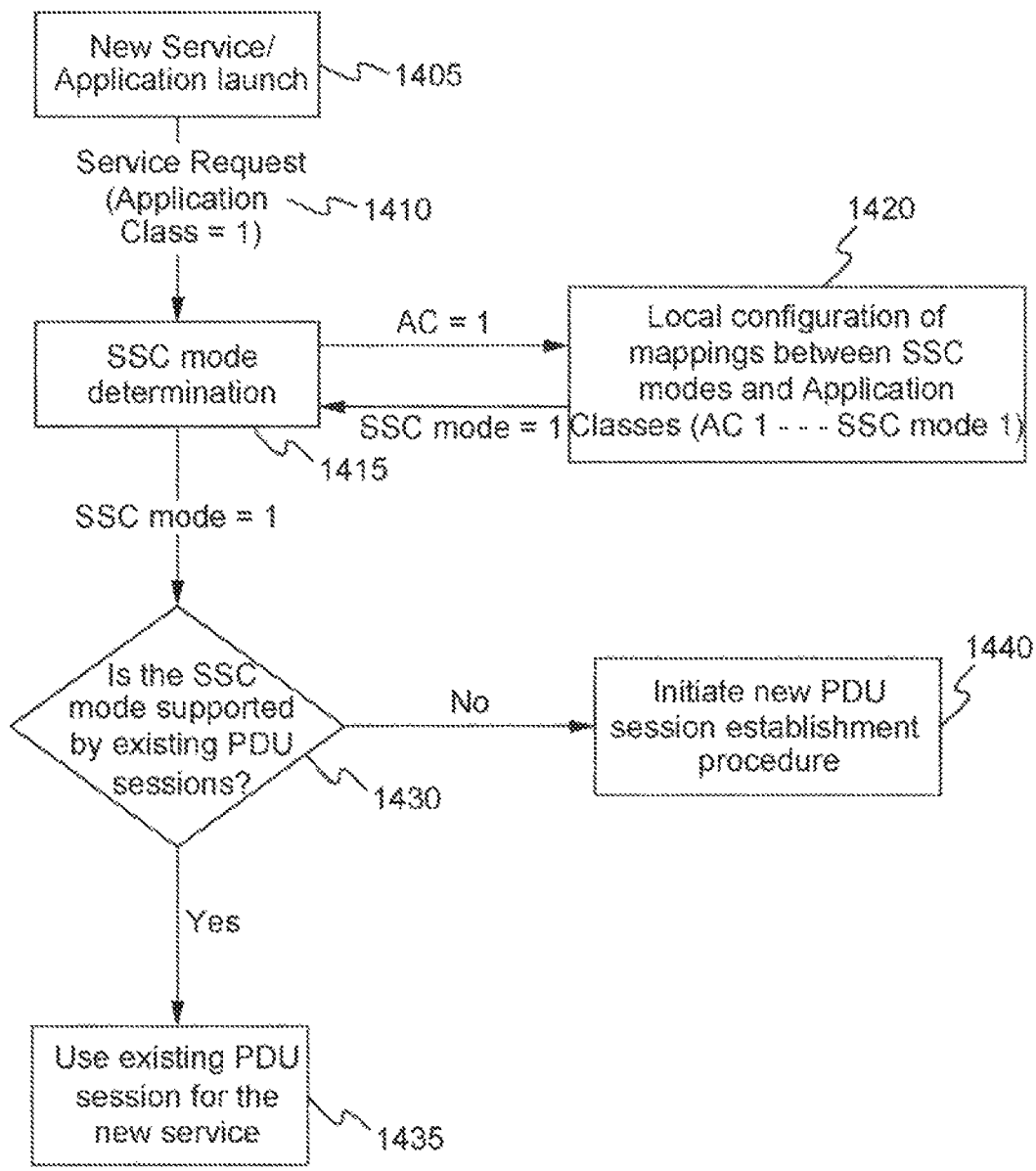
FIG. 14 is a flow diagram for determining an SSC level for a new service and determining whether a new PDU session is needed.

FIG. 14 illustrates determining an SSC mode for a new service and determining whether a new PDU session is needed. When a WTRU launches a new service or application, the WTRU may need to determine whether established PDU sessions including a default PDU session and other PDU sessions may accommodate session continuity requirements of the new service or application. For example, when a new service or application is launched at step 1405, the WTRU may receive a service request that includes application class information (e.g., Application Class=1) from the application or service layer at step 1410. At step 1415, the WTRU may determine what SSC mode is required for the new service or application. The WTRU may have a local configuration that indicates what SSC mode is required for each application class. At step 1420, by looking up the local configuration with the received application class (e.g., AC=1), the WTRU may be able to determine the SSC mode required for the new service or application (e.g., SSC mode=1). The local configuration may include mappings between SSC modes and application classes, for example, AC 1==SSC mode 1.

In an embodiment, the WTRU may store SSC modes that were previously determined for the service or application in a local database. This may be performed either by the WTRU itself or by the network. Once the same service or application is launched, the WTRU may look up the local database and apply the same SSC mode for this service or application.

After locally determining the proper SSC mode of the new service or application at step 1415, the WTRU may check the new service or application against the SSC mode(s) of the existing PDU sessions at step 1430. If there is an existing PDU session that may accommodate the desired SSC mode for the new service or application, the WTRU may use the existing PDU session to carry the new service or application at step 1435. Otherwise, the WTRU may initiate a new PDU session establishment procedure at step 1440.

Figure 15:
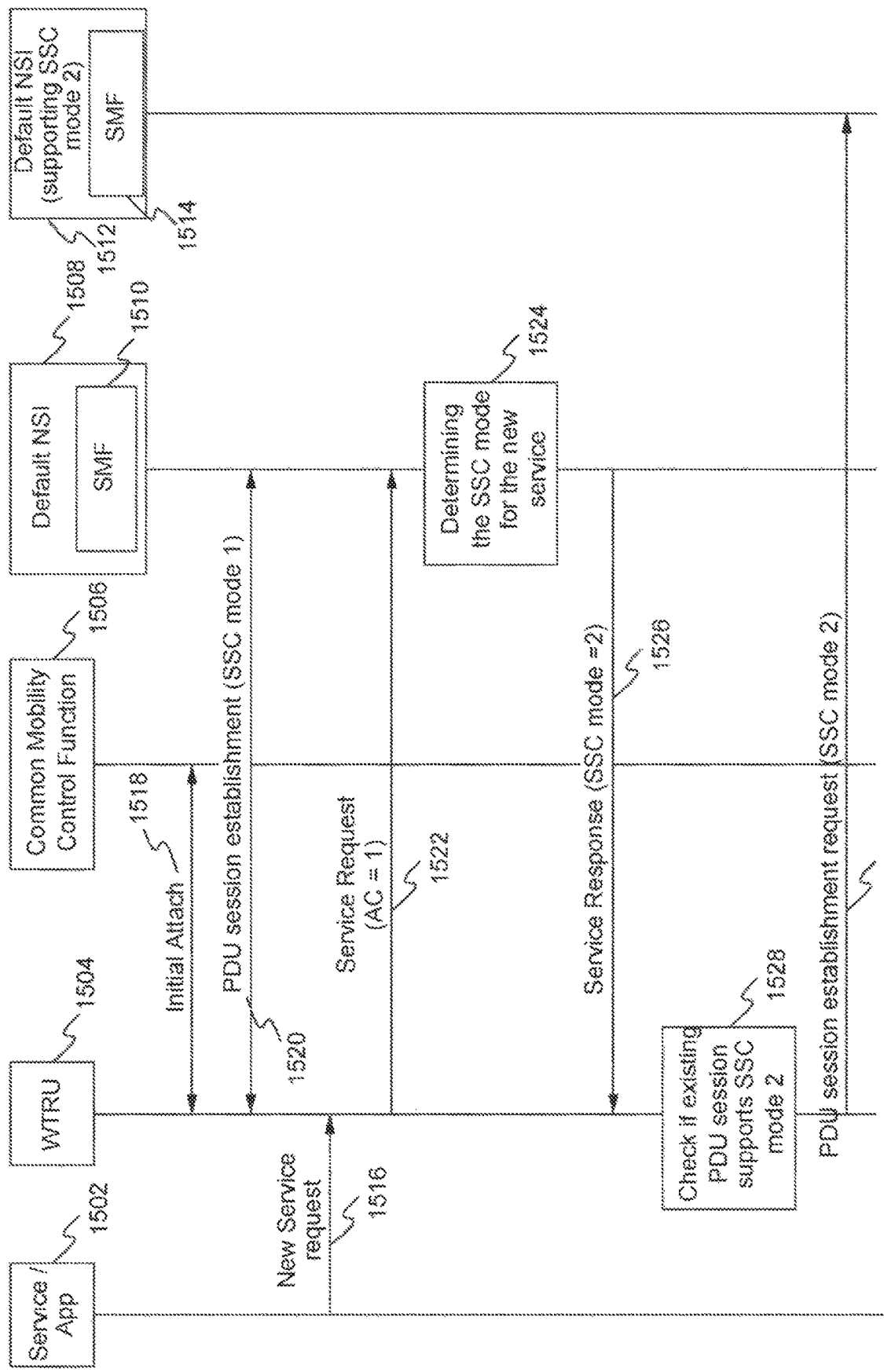
FIG. 15 is a signaling diagram illustrating a network determining SSC mode for a new service.

Alternatively, a WTRU may rely on a network to determine the SSC mode of a new service or application. FIG. 15 illustrates a network determining SSC mode for a new service or application 1502. In this example, it is assumed that the WTRU 1504 is already assigned its initial SSC mode (e.g., SSC mode 1) of the PDU session by the PDU session establishment procedure 1520 as described in FIG. 12 and FIG. 13. When a new service or application 1502 is launched, the new service or application 1502 may send a new service request to the WTRU 1504 with an indication of application class (e.g., Application Class=1) at step 1516. Upon receiving the new service request, the WTRU 1504 may send a service request message to the SMF 1510 via a common mobility control function 1506 at step 1522 or a control function in the NSI that the WTRU 1504 is currently connected to. In the service request message, the WTRU 1504 may indicate the application/service level information such as the application class (e.g., AC=1).

After receiving the service request message, at step 1524, the SMF 1510 or a control function that handles the service request message in the default NSI 1508 may derive the proper SSC mode (e.g., SSC mode=2) for the service/application 1502. Specifically, the SMF 1510 or the control function may check the indicated application class against the local configuration of mapping between application classes and SSC modes, thereby determining the proper SSC mode for the new service request. The SMF 1510 or the control function then may send the determined SSC mode (e.g., SSC mode=2) back to the WTRU 1504 in a service response message at step 1526. After receiving the service response message, the WTRU 1504 may further determine whether a new PDU session is needed at step 1528. For example, the WTRU 1504 may check if the existing PDU session that was established at step 1520 supports the determined SSC mode (e.g., SSC mode 2). If the existing PDU session does not support the determined SSC mode, the WTRU 1504 may send a PDU session establishment request with the determined SSC mode (e.g., SSC mode 2) to a SMF 1514 in a NSI 1512 that supports the determined SSC mode (e.g., SSC mode 2) at step 1530.

As described above, a PDU session may be associated with a single SSC mode. The single SSC mode may be sent to a core network control plane (CN-CP) node by a WTRU. Alternatively, the single SSC mode may be assigned by a CN-CP based on the WTRU subscription and/or local policies. In either case, the CN-CP node may send some traffic detection rules to the UP-GW serving the PDU connection. The traffic detection rules sent to the UP-GW may be one or more forms of flow descriptors, IP 5 tuples, application ID(s) of the application to detect and/or packet markings, or the like. The CN-CP may also specify certain application messages that UP-GW may need to detect. Such application messages may be related to either maintaining application level service continuity, transmission control protocol (TCP) connection lost messages, or the like. Examples of the CN-CP node include an SMF, an AMF, or the like. Examples of the UP-GW include a UPF or the like.

The UP-GW may then analyze and detect the traffic going over that PDU connection. The WTRU traffic report may be sent to the CN-CP node. The WTRU traffic report may be sent either periodically or upon detection of traffic which is outside the parameters of the defined rules, or in both cases. Based on the received WTRU traffic report, the CN-CP may determine if the current SSC mode is optimal for the type of traffic flows on that PDU connection. This determination may be based on the knowledge that traffic belonging to a different SSC mode is flowing over that PDU connection. The CP-CN node may take into account the duration of that traffic flow to make a decision whether a change in SSC mode is required. Other decision criteria may include a number of application flows on that PDU connection that require a different SSC mode, frequency of such applications, or the like.

Once the CN-CP node determines that a change in the SSC mode is required, the CN-CP node may then either disconnect the current PDU session with reconnection request or send a modified PDU connection request message. In both cases, the CN-CP may include the new SSC mode and possibly a cause code to the WTRU which indicates the reason for PDU session disconnection or PDU modification procedure.

Figure 16:
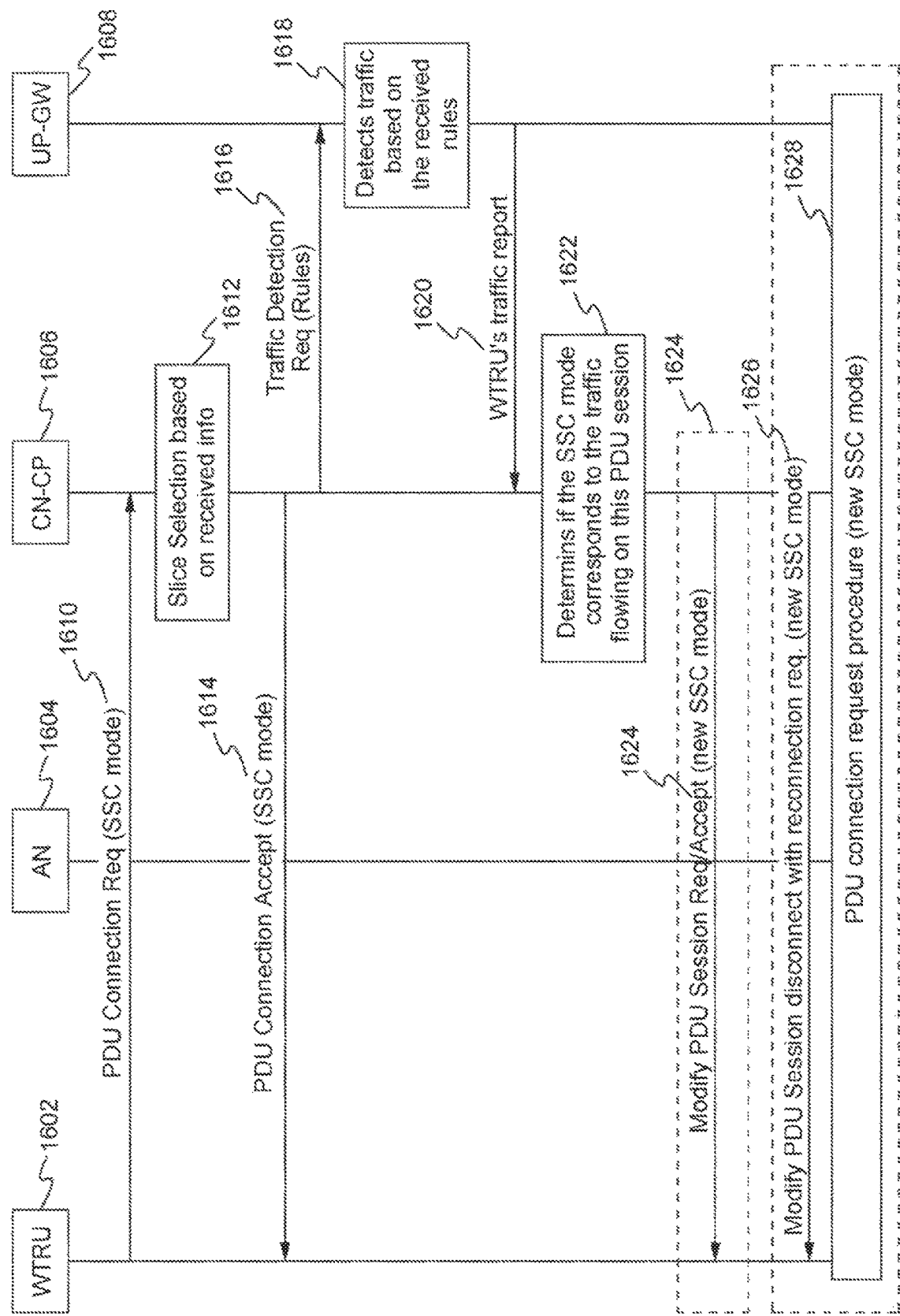
FIG. 16 is a signaling diagram which illustrates a network triggered SSC mode update based on traffic detection.

FIG. 16 is a signaling diagram which illustrates a network triggered SSC mode update based on traffic detection. At step 1610, a WTRU 1602 may send a PDU connection request with a desired SSC mode to a CN-CP 1606. At step 1612, the CN-CP 1606 may select a NSI based on the receive information from the PDU connection request message. At step 1614, the CN-CP 1606 may send a PDU connection accept message with a SSC mode that the NSI supports. During these steps 1610, 1612, 1614, the CN-CP node 1606 may decide whether to request a traffic report from an UP-GW node 1608. If the CN-CP node 1606 determines to request a traffic report, the CN-CP 1606 may request the UP-GW 1608 to perform traffic detection on this PDU connection by sending a traffic detection request message to the UP-GW 1608 at step 1616.

Rules for detecting specific traffic or messages may also be sent to the UP-GW 1608 as described above. The rules sent to the UP-GW 1608 may be one or more forms of flow descriptors, IP 5 tuples, application ID(s) of the application to detect and/or packet markings, or the like. The CN-CP 1606 may also specify certain application messages that the UP-GW 1608 may need to detect. At step 1608, the UP-GW 1608 may perform traffic detection on the traffic of the PDU connection based on the received rules. At step 1620, the UP-GW 1608 may send a WTRU's traffic report to the CN-CP 1606. The traffic report may be a periodic WTRU traffic report or a report that is triggered when the UP-GW 1608 detects traffic which does not comply with the rules configured at step 1616.

Upon receiving the WTRU traffic report, at step 1622, the CN-CP 1606 may determine if the current SSC mode is optimal for the type of traffic flows on that PDU connection. This determination may be based on the knowledge that traffic belonging to a different SSC mode is flowing over the PDU connection. The CP-CN node 1606 may take into account the duration of that traffic flow to make a decision whether a change in the SSC mode is required. Other decision criteria may include number of application flows on that PDU connection which require a different SSC mode and the frequency of such applications.

The CN-CP 1606 may perform either a step 1624 or steps 1626, 1628 together. At step 1624, if the CN-CP 1606 decides to modify the current PDU connection, the CN-CP 1606 may trigger the modification procedure by transmitting a modify PDU session request/accept message. The new SSC mode may be included in the modify PDU connection message. At steps 1626, the CN-CP 1606 may send a modify PDU disconnect message to the WTRU 1602 to disconnect the current PDU connection with a reconnection request. The new SSC mode may be included in the PDU Connection disconnect message. Upon receiving the PDU session disconnect with a reconnection request, at step 1628, the WTRU 1602 may initiate a PDU connection request procedure with a new SSC mode.

In an embodiment, a change in the SSC Mode may be provided for switching flows across PDN Connections. For example, a WTRU may have a set of IP flows using a PDN connection A with an SSC mode 3. Each of the IP flows may include at least a source IP, a source port number, a destination IP, a destination port number, a protocol type, and the like. In this example, it is assumed that the SSC mode 3 does not provide session continuity (i.e. IP address preservation). The WTRU may have another PDN connection, for example, a PDN connection B with an SSC mode 1. It is also assumed for the example that the SSC mode 1 implies that service continuity is supported (i.e. IP address preservation is supported).

At any time, the core network (CN) may determine that at least one flow may be switched from one PDN connection to another PDN connection when a different SSC mode handling is needed. It should be noted that switching by the CN may mean that at least one CN entity is involved. The CN entity may be a CP node, a UP node, or the like. An example of the CP node may include an AMF, an SMF, a Policy Control Function (PCF), or the like. An example of the UP node may include any user plane node such as an UP-GW, an UPF, or the like.

The CN may determine whether it needs to update the SSC mode for a set of flows using any combination of the methods disclosed herein. For example, a WTRU may send a request to the CN to update the SSC mode for the set of flows. The request may indicate the flows for which such update is desired. The WTRU may also include an application ID corresponding to each flow in the request. The WTRU may send the update request based on a request from the higher layers, for example, the application client in the WTRU, using any of the methods disclosed for establishing a PDN connection with a particular SSC mode. The WTRU may send the update request based on an interaction by a user via a user interface, optionally for a well-known application or session, or the like.

The CN may, based on local policies, determine to change the SSC mode for a particular set of flows. An Application Function (AF) or Application Server (AS, or 3$^{rd}$ party application providers) may also request a change of the SSC mode for a particular flow. For example, the AF or AS may request the change with the CN via an exposure function (e.g., an API) or via an interface with the network's PCF. The exposure function or the PCF may further notify other CN nodes such as an SMF. The SMF may in turn inform an AMF. At some point, a particular CP function may take other aspects into account, for example, the AF identity, AS identity, user subscription profile, local policies, or the like to determine whether the request may be granted. The CN may receive updated subscription information from the subscriber repository indicating that a change of the SSC mode is allowed for the WTRU, optionally per a set of identified flow and/or application ID.

Once the CN determines to apply a new SSC mode for a set of flows, a CP node may select appropriate CP and UP nodes that may handle the request. The AMF then may send a request to the target CP/UP nodes that are associated with the new SSC mode for the selected/determined flows. The AMF may send a request to these nodes to handle the identified flows.

An SMF may receive a request to add a set of flows into an existing PDN connection, or if the same SMF may provide different SSC modes, the SMF may receive a request to update the SSC mode handling for a particular set of flows. The SMF may update the SSC mode associated with the flows. The SMF may further update other CP or UP nodes in the system such that the identified flows may be treated according to the new SSC mode. The SMF may respond to the AMF indicating the result of the request.

A CP node such as an AMF may be responsible for the execution of the SSC mode update per flow. Specifically, the CP node may send a request to a WTRU indicating that a particular flow is subject to the update of the SSC mode. Specifically, the AMF may also provide a time during which this update becomes effective. The AMF may send a new message to the WTRU and indicate the change of SSC mode per flow, and optionally per application ID. The AMF may actually send a request for a new PDN connection to the WTRU, indicating the SSC mode of this connection to be the required SSC mode needed for the IP flows. The AMF may also trigger the establishment of such PDN connection in the network side which may lead to a new NSI selection. If a request for a new PDN connection is sent to the WTRU, the network may indicate that the reason for doing so is an update of the SSC mode for a set of identified IP flows, and optionally a set of application IDs, or the like.

When a WTRU receives a new indication to update the SSC mode for a set of well-defined flows and optionally application IDs, the WTRU may inform higher layers about the change of IP address for the application associated with the target IP flows and application ID. The new indication may be a request for a new PDN connection with a new SSC mode. The CN may also identify the new SSC mode for the IP flows. The WTRU may in turn send: (i) an acknowledgement message to accept or reject the request and identifies the target flow and application ID; (ii) a request to update an existing PDN connection to, for example, add the flows to the PDN connection that serves the target SSC mode; (iii) a request to update an existing PDN connection to, for example, remove the flows from a PDN connection that provides an SSC mode that is no longer desired. When the CN updates a target PDN connection such that a target set of flows are subject to a target SSC mode, the CN may initiate the modification of another PDN connection so that the flows are removed from that connection that provided an SSC mode that is no longer desired.

Figure 17:
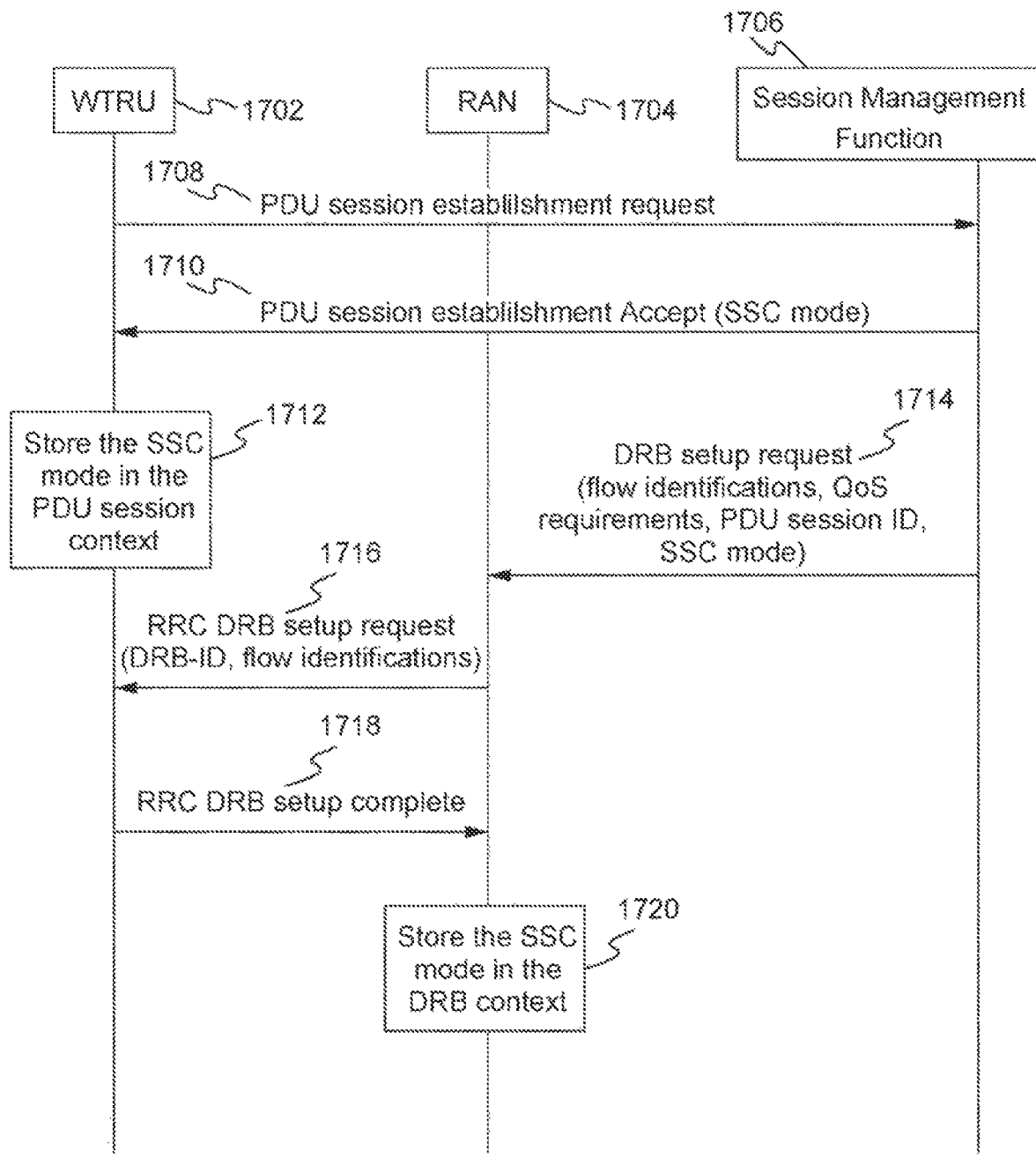
FIG. 17 is a signaling diagram which illustrates receiving an SSC mode for a data radio bearer (DRB) from a session management function (SMF)

FIG. 17 is a signaling diagram which illustrates receiving an SSC mode for a data radio bearer (DRB) from a session management function (SMF) 1706. As described above, a WTRU 1702 may initiate a PDU session by sending a PDU session establishment request to an SMF 1706 in a NSI at step 1708. The SMF 1706 may send a PDU session establishment accept to the WTRU 1702 with a confirmed SSC mode at step 1710. The WTRU 1702 may store the SSC mode in the PDU session context at step 1712. After the WTRU 1702 has established the PDU session with the NSI, data radio bearers (DRBs) belonging to that PDU session may be established between the WTRU 1702 and a RAN 1704. Application flows that require similar Quality of Service (QoS) treatment may be carried over the same DRB. Application flows that do not have particular QoS requirements may be carried over a default DRB. The SMF 1706 in the CN may use explicit signaling to establish the mapping between flows and DRBs at both WTRU 1702 and RAN 1704 sides.

At step 1714, the RAN 1704 may receive a DRB setup request from the SMF 1706 when it requests establishment of a DRB. The DRB setup request may include flow identifications, QoS requirements, a PDU session ID, an SSC mode, and the like. To make the RAN 1704 aware of the SSC mode for a DRB, the SMF 1706 may retrieve the SSC mode information from the session context and include the SSC mode information in the signaling to the RAN 1704 that is requesting the setup of a new DRB. This can be happened when: (i) the SMF 1706 has determined which PDU session that a new service or application flow belongs; or (ii) the SMF 1706 determines that a new DRB needs to be established because existing DRBs cannot fulfill the QoS requirements of the new service data flow.

At step 1716, the RAN 1704 may send an RRC DRB setup request to the WTRU 1702 to establish a DRB between the WTRU 1702 and the RAN 1704. The RRC DRB setup request may include a DRB-ID, flow identifications, or the like. Upon receiving the RRC DRB setup request, the WTRU 1702 may send an RRC DRB setup complete message to the RAN 1704 at step 1718. A DRB may then be established between the WTRU 1702 and the RAN 1704 and the RAN 1704 may store the SSC mode in the DRB context at step 1720.

Figure 18:
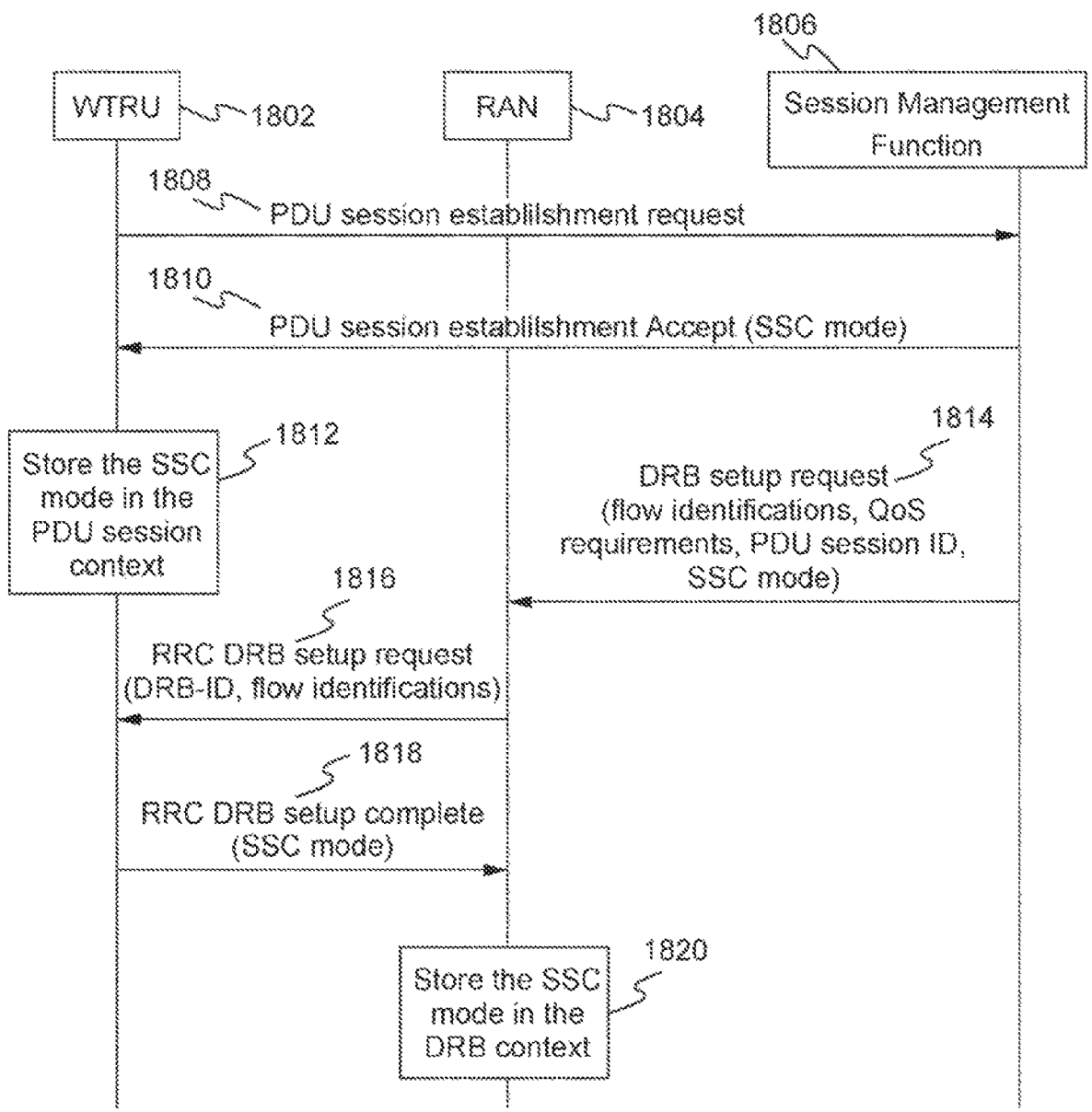
FIG. 18 is a signaling diagram which illustrates receiving an SSC mode for a DRB from a WTRU.

FIG. 18 is a signaling diagram which illustrates receiving an SSC mode for a DRB from a WTRU 1802. As described above, a WTRU 1802 may initiate a PDU session by sending a PDU session establishment request to a SMF 1806 in a NSI at step 1808. Upon receiving the PDU session establishment request, the SMF 1806 may send a PDU session establishment accept message to the WTRU 1802 with a confirmed SSC mode at step 1810. The WTRU 1802 may then store the SSC mode in the PDU session context at step 1812. After the WTRU 1802 has established the PDU session with the NSI, data radio bearers (DRBs) belonging to that PDU session may be established between the WTRU 1802 and a RAN 1804. Specifically, at step 1814, the RAN 1804 may receive a DRB setup request from the SMF 1806 when it requests establishment of a DRB. The DRB setup request may include flow identifications, QoS requirements, a PDU session ID or the like.

At step 1816, the RAN 1804 may send an RRC DRB setup request to the WTRU 1802 to establish a DRB between the WTRU 1802 and the RAN 1804. The RRC DRB setup request may include a DRB-ID, flow identifications, and the like. The RRC DRB setup request may also include mapping information between the flow identifications (e.g., the IP tuples) and the DRB to be established. When the WTRU 1802 receives the RRC DRB setup request from the RAN 1804 for DRB configuration, the WTRU 1802 may first determine which PDU session belongs to the DRB based on the mapping information between the flow identification information and the DRB information. The WTRU 1802 may then retrieve an SSC mode from the PDU session context if it is available. At step 1818, the WTRU 1802 may send an RRC DRB setup complete message with the SSC mode to inform the RAN 1804 the SSC mode requirement for the established DRB. A DRB may then be established between the WTRU 1802 and the RAN 1804 and the RAN 1804 may store the SSC mode in the DRB context at step 1820. Alternatively, the SSC mode may be incorporated into the PDU session ID that is included in the DRB setup request 1814.

Figure 19:
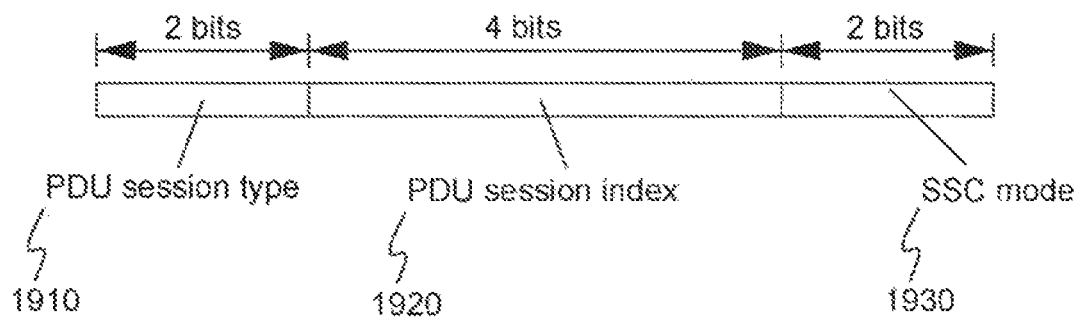
FIG. 19 illustrates an exemplary PDU session ID that incorporates an SSC mode.

FIG. 19 illustrates an exemplary PDU session ID 1900 that incorporates an SSC mode 1 930. As shown in FIG. 19, the PDU session ID 1900 may be one byte frame that comprises a PDU session type 1910, a PDU session index 1920, and an SSC mode 1 930. The PDU session type 1910 may include an IP type, a non-IP type, an Ethernet type, or the like. The PDU session index 1920 may have four bits to indicate the number of PDU session. The SSC mode 1 930 may include an SSC mode 1, an SSC mode 2, an SSC mode 3, or the like.

As a WTRU may simultaneously have multiple PDU sessions, there may be multiple DRBs established for those PDU sessions. Some exemplary scenarios are disclosed herein. In a first scenario, all DRBs are of the same SSC mode which does not require session continuity. In this scenario, a WTRU does not require session continuity at all. The WTRU may receive a measurement configuration from a RAN that does not require the WTRU to report the measurement result. The WTRU may make a decision when to handover to a better cell based on the measurement result. The RAN may configure criteria or thresholds for some measurement metrics so that the WTRU may start autonomous handover once those criteria or thresholds are met.

In a second scenario, all DRBs are of the same SSC mode that requires session continuity. In this scenario, a RAN may apply regular measurement and handover control. In a third scenario, some DRBs are of the SSC mode that does not require session continuity, but other DRBs do require session continuity. In this scenario, a RAN may apply regular measurement and handover control. However, a user plane (i.e. a user plane operation inside the RAN) that handles those DRBs (i.e. DRBs that does not require session continuity and DRBs that requires session continuity) may be differentiated during the handover procedure. For example, a RAN may need to forward downlink (DL) data to a target RAN before the handover is complete for those DRBs that require session continuity, but may simply drop DL data of those DRBs that do not require session continuity.

Figure 20A:
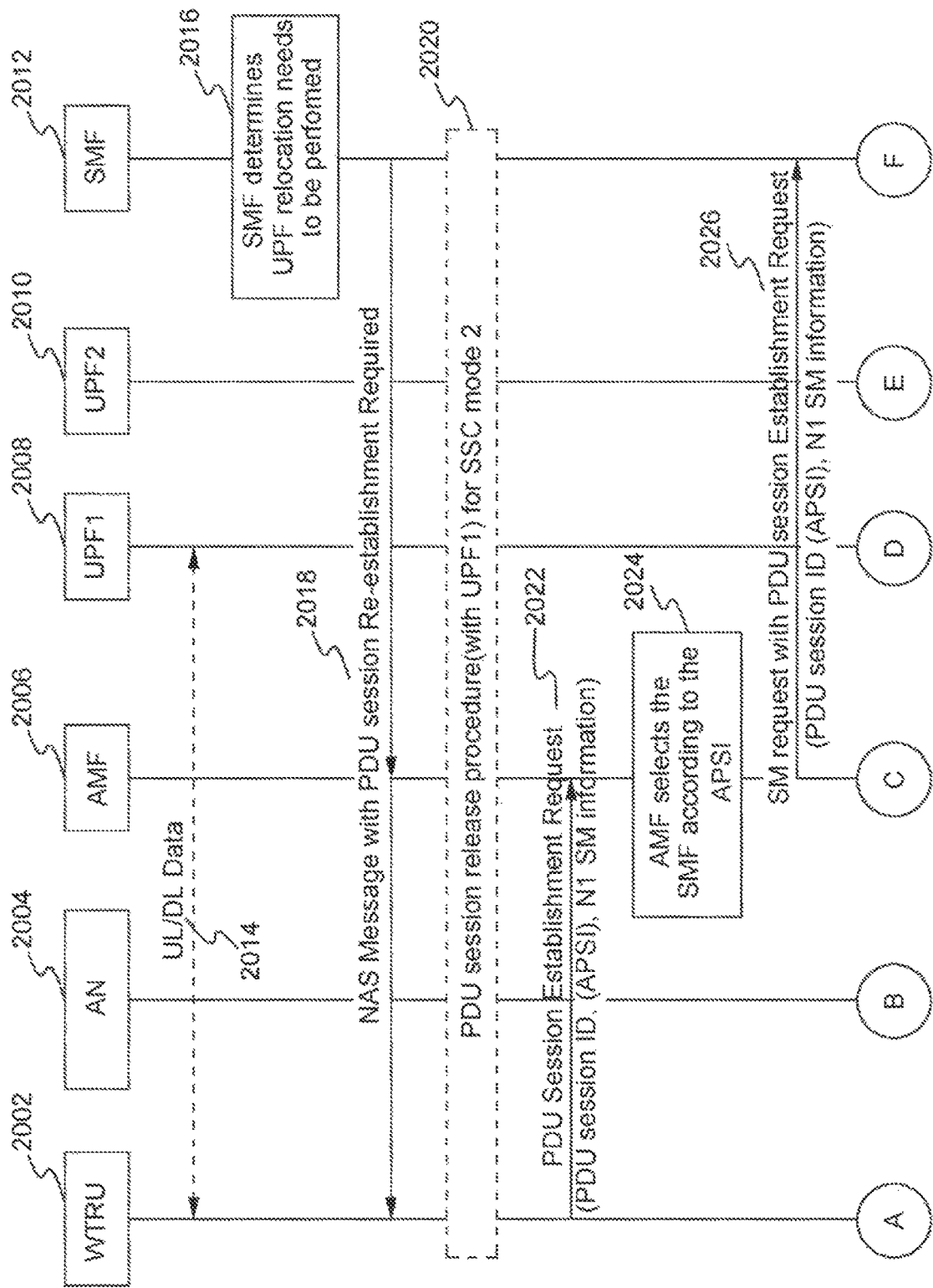
FIG. 20A is a signaling diagram which illustrates transmitting a mobility management (MM) non-access stratum (NAS) message that includes an associated PDU session ID (APSI)
Figure 20B:
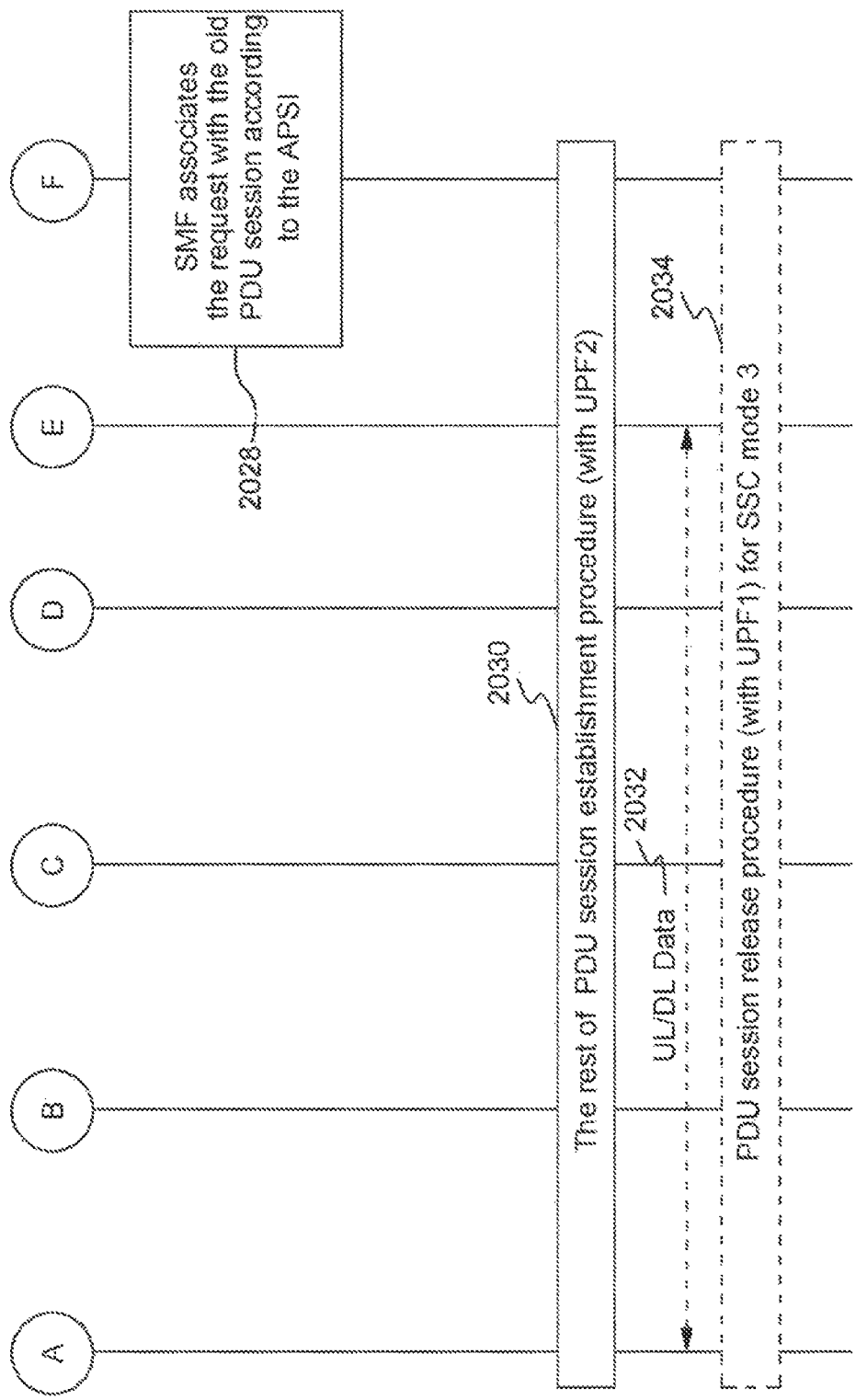
FIG. 20B is a continuation of FIG. 20A.

FIGS. 20A and 20B are a signaling diagram which illustrates transmitting a mobility management (MM) non-access stratum (NAS) message that includes an associated PDU session ID (APSI). In this example, it is assumed that a PDU session with an SSC mode 2 or an SSC mode 3 is already established between a WTRU 2002 and an UPF1 2008. Thus, the existing PDU session is carrying UP/DL data between the WTRU 2002 and the UPF1 2008 at step 2014. Although there already exists a PDU session, a SMF 2012 may determine that UPF relocation needs to be performed at step 2016 when a different SSC mode handling is needed. If the SMF 2012 determines the UPF relocation for the current PDU session, the SMF 2012 may send a NAS message with an indication of PDU session re-establishment required to the WTRU 2002 via an Access Network (AN) 2014 at step 2018.

After the WTRU 2002 receives the NAS message with the indication of PDU session re-establishment required or a request for a new PDU session to the same data network (DN) from the SMF 2012, the WTRU 2002 may trigger the PDU session release procedure with the UPF1 2008 at step 2020 if the SSC mode of the existing PDU session is an SSC mode 2. At step 2022, the WTRU 2002 may transmit a PDU session establishment request to an AMF 2006 in response to the NAS message of the PDU session re-establishment. The PDU session establishment request may include a PDU session ID (i.e. APSI) and N1 Session Management (SM) information. The APSI in the PDU session establishment request may be an old PDU session ID assigned for the old PDU session to allow that the network element could associate the new PDU session with the old PDU session. In an embodiment, the WTRU 2002 may include the APSI as a dedicated information element (IE) in the mobility management NAS message.

Upon receiving the PDU session Establishment request, the AMF 2006 may select the SMF 2012 according to the APSI at step 2024. The AMF 2006 may include the APSI in the SM request message and transmit the SM request message to the SMF 2012 with the PDU session establishment request at step 2026. The SM request message may also include the PDU session ID (i.e. APSI) and the N1 SM information. After receiving the SM request message from the AMF 2006, at step 2028, the SMF 2012 may associate the PDU session establishment request with the old PDU session according to the APSI. At step 2030, the WTRU 2002 may perform the rest of PDU session establishment procedure with a UPF2 2010. After the new PDU session is established, UL/DL data may be transmitted via the PDU session between the WTRU 2002 and the UPF2 2010. If the SSC mode of the old PDU session is an SSC mode 3, the WTRU 2002 may initiate a PDU session release procedure with the UPF1 2008 at step 2034. It should be noted that the AMF 2006 may need to keep the old PDU session context for a short period of time if the old PDU session is released in step 2020, in order that the AMF 2006 may select the correct SMF in step 2024.

Figure 21A:
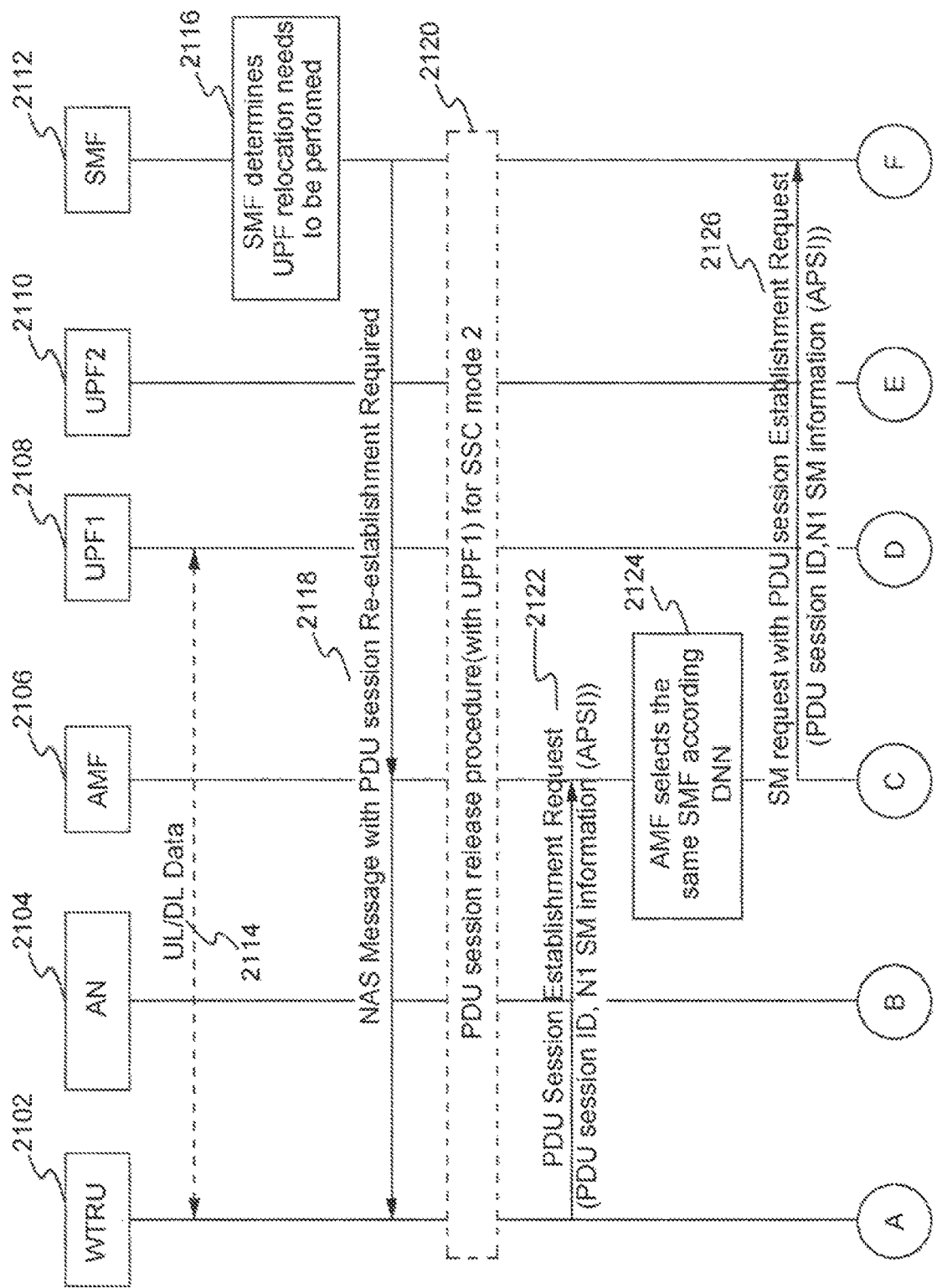
FIG. 21A a signaling diagram which illustrates transmitting N1 session mobility (SM) information that includes an APSI.
Figure 21B:
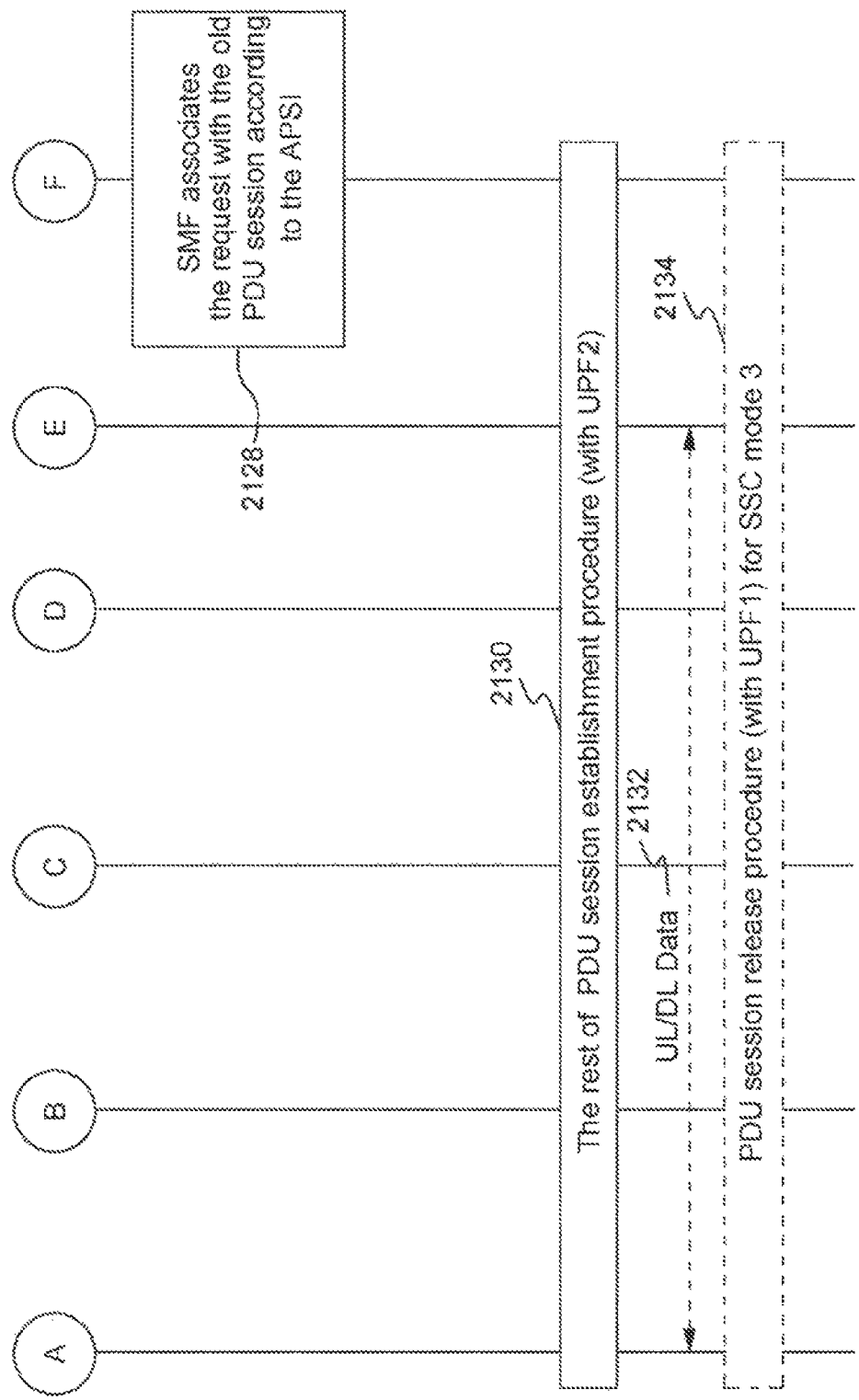
FIG. 21B is a continuation of FIG. 21A.

FIGS. 21A and 21B are a signaling diagram which illustrates transmitting N1 session mobility (SM) information that includes an APSI. Similar to the example in FIGS. 20A and 20B, in this example, it is assumed that a PDU session with an SSC mode 2 or an SSC mode 3 is already established between a WTRU 2102 and an UPF1 2108. Thus, the existing PDU session is carrying UP/DL data between the WTRU 2102 and the UPF1 2108 at step 2014. As described above, when a different SSC mode handling is needed, a SMF 2112 may determine that UPF relocation needs to be performed at step 2116. If the SMF 2112 determines the UPF relocation for the current PDU session, the SMF 2112 may send a NAS message with an indication of PDU session re-establishment required to the WTRU 2102 via an Access Network (AN) 2114 at step 2118.

After the WTRU 2102 receives the NAS message with the indication of PDU session re-establishment required, if the SSC mode of the existing PDU session is an SSC mode 2, the WTRU 2102 may initiate the PDU session release procedure with the UPF1 2108 at step 2120. At step 2122, the WTRU 2102 may send a PDU session establishment request to an AMF 2106 in response to the NAS message. The PDU session establishment request may include a PDU session ID and N1 Session Management (SM) information. Unlike the example described in FIGS. 20A and 20B where the APSI was included in the PDU session ID, in this example, the N1 SM information may include the APSI (i.e. an old PDU session ID assigned for the old PDU session). Considering that the AMF 2106 may always select the same SMF 2112 for the WTRU's PDU session towards the same Data Network Name (DNN), the APSI may only be used by the SMF 2112. This means that the AMF 2106 may not need to use the APSI for the SMF selection. Thus, the APSI may be included in the N1 SM information.

Upon receiving the PDU session establishment request, the AMF 2106 may select the same SMF 2112 according to the DNN at step 2124. The AMF 2106 send the SM request message to the SMF 2112 at step 2126. The SM request message may include the APSI in the N1 SM information. After receiving the SM request message, at step 2128, the SMF 2112 may associate the PDU session establishment request with the old PDU session according to the APSI. At step 2130, the WTRU 2102 may perform the rest of PDU session establishment procedure with a UPF2 2110. After the new PDU session is established, UL/DL data may be carried via the PDU session between the WTRU 2102 and the UPF2 2110. If the SSC mode of the old PDU session is an SSC mode 3, the WTRU 2102 may initiate a PDU session release procedure with the UPF1 2108 at step 2134 after the PDU session is established with UPF2 2110.

Figure 22A:
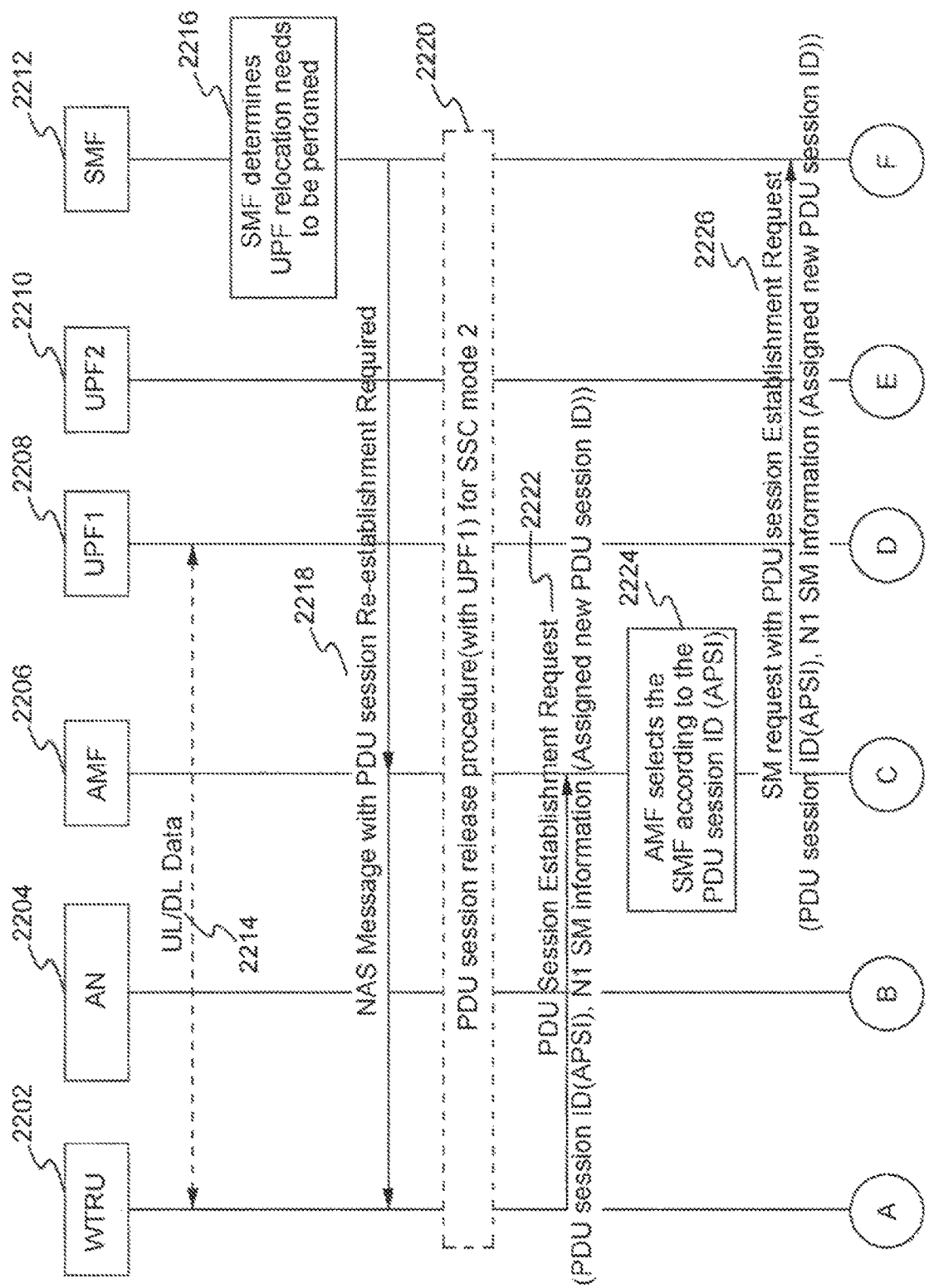
FIG. 22A is a signaling diagram which illustrates transmitting an MM message that includes a PDU session ID (APSI) and an SM message that includes a new PDU session ID.
Figure 22B:
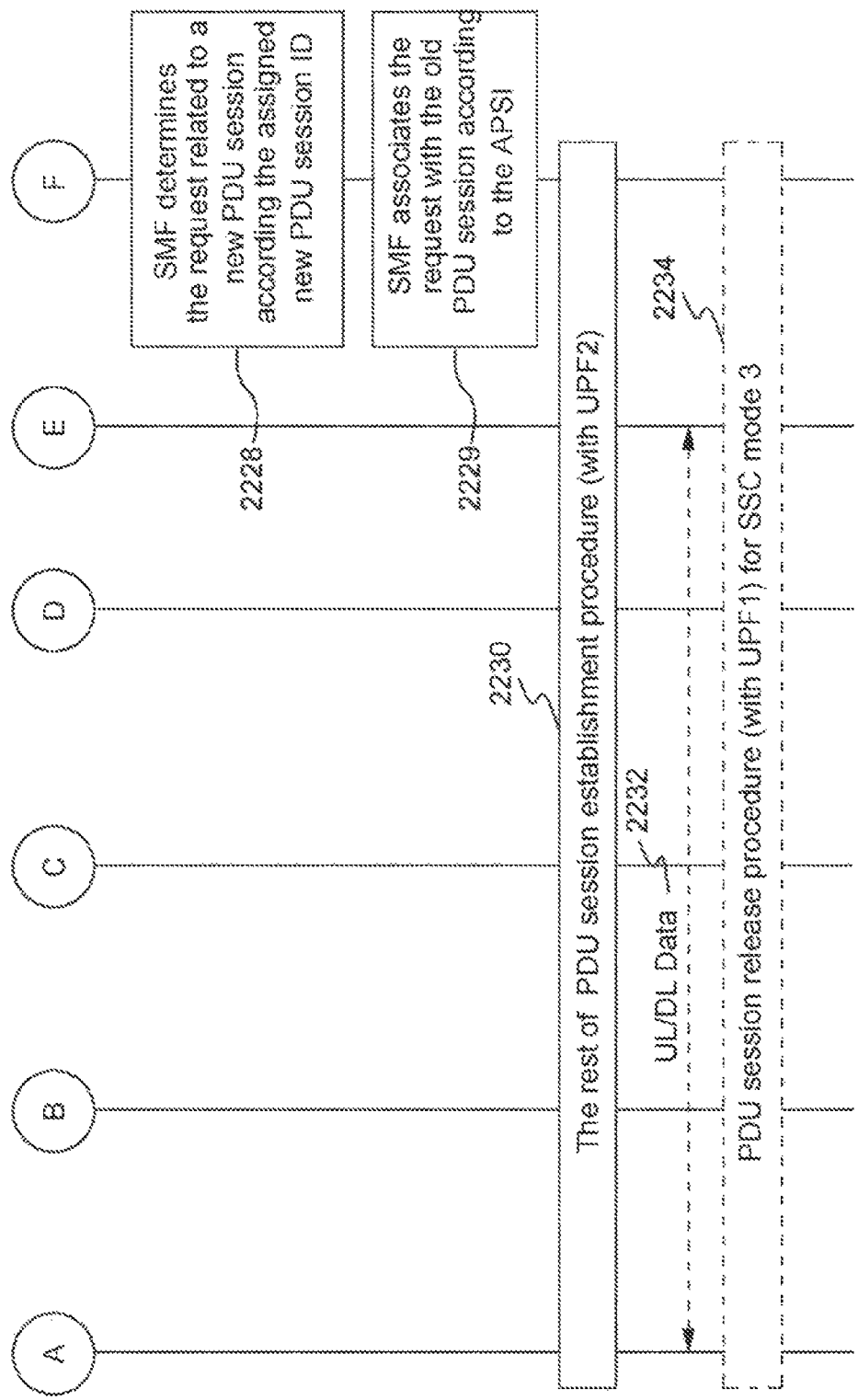
FIG. 22B is a continuation of FIG. 22A.

FIGS. 22A and 22B are a signaling diagram which illustrates transmitting an MM message that includes a PDU session ID (APSI) and an SM message that includes a new PDU session ID. Similar to the example in FIGS. 21A and 21B, in this example, it is assumed that a PDU session with an SSC mode 2 or an SSC mode 3 is already established between a WTRU 2202 and an UPF1 2208. Thus, the existing PDU session is carrying UP/DL data between the WTRU 2202 and the UPF1 2208 at step 2214. As described above, when a different SSC mode handling is needed, a SMF 2212 may determine that UPF relocation needs to be performed at step 2216. If the SMF 2212 determines UPF relocation for the existing PDU session, the SMF 2212 may send a NAS message with an indication of PDU session re-establishment required to the WTRU 2202 via an Access Network (AN) 2214 at step 2218.

After the WTRU 2202 receives the NAS message with the indication of PDU session re-establishment required, if the SSC mode of the existing PDU session is an SSC mode 2, the WTRU 2202 may initiate the PDU session release procedure with the UPF1 2208 at step 2220. At step 2222, the WTRU 2202 may send a PDU session establishment request to an AMF 2206 in response to the NAS message. The PDU session establishment request may include a PDU session ID information element (IE) and an N1 SM information IE. Unlike the examples in FIGS. 20A, 20B, 21A and 21B, in this example, the WTRU 2202 may set the value of PDU session ID IE to the APSI and include an assigned new PDU session ID in the N1 SM information IE. As described above, the APSI is an old PDU session ID. The assigned new PDU session ID may be generated by the WTRU 2202 for the new PDU session.

Upon receiving the PDU session establishment request, the AMF 2206 may select the SMF 2212 according to the PDU session ID (i.e. APSI) at step 2224. Because the APSI may be the old PDU session ID, the AMF 2206 may route the PDU session establishment request message to the SMF 2212 which is serving to the old PDU session. Specifically, the AMF 2106 may send the SM request message to the SMF 2112 at step 2226. The SM request message may include the APSI and the assigned new PDU session ID. After receiving the SM request message, at step 2228, the SMF 2212 may check the N1 SM information and determine that the request is related to a new PDU session according the assigned new PDU session ID in the N1 SM information. At step 2229, the SMF 2212 may associate the request with the old PDU session according to the APSI.

Unlike the examples in FIGS. 20A, 20B, 21A and 21B, in this example, there may be no impact on the AMF 2206 because for the AMF 2206, the PDU session establishment request at step 2222 is a message for the existing PDU session, rather than a new PDU session. The SMF 2212 may need to determine that the message (i.e. SM request message) is related to the new PDU session according the assigned new PDU session ID in the N1 SM information. For any subsequent session management signaling for this PDU session, the WTRU 2202 may also include both the APSI in the MM part of the message and the new assigned PDU session ID in the SM information part of the session management message.

After the SMF 2212 determines the request related to the new PDU session according the assigned new PDU session ID and associate the request with the old PDU session according to the APSI, at step 2230, the WTRU 2202 may perform the rest of PDU session establishment procedure with a UPF2 2210. After the new PDU session is established, UL/DL data may be carried via the PDU session between the WTRU 2202 and the UPF2 2210. If the SSC mode of the old PDU session is an SSC mode 3, the WTRU 2202 may initiate a PDU session release procedure with the UPF1 2208 at step 2234 after the PDU session is established with the UPF2 2210.

Figure 23:
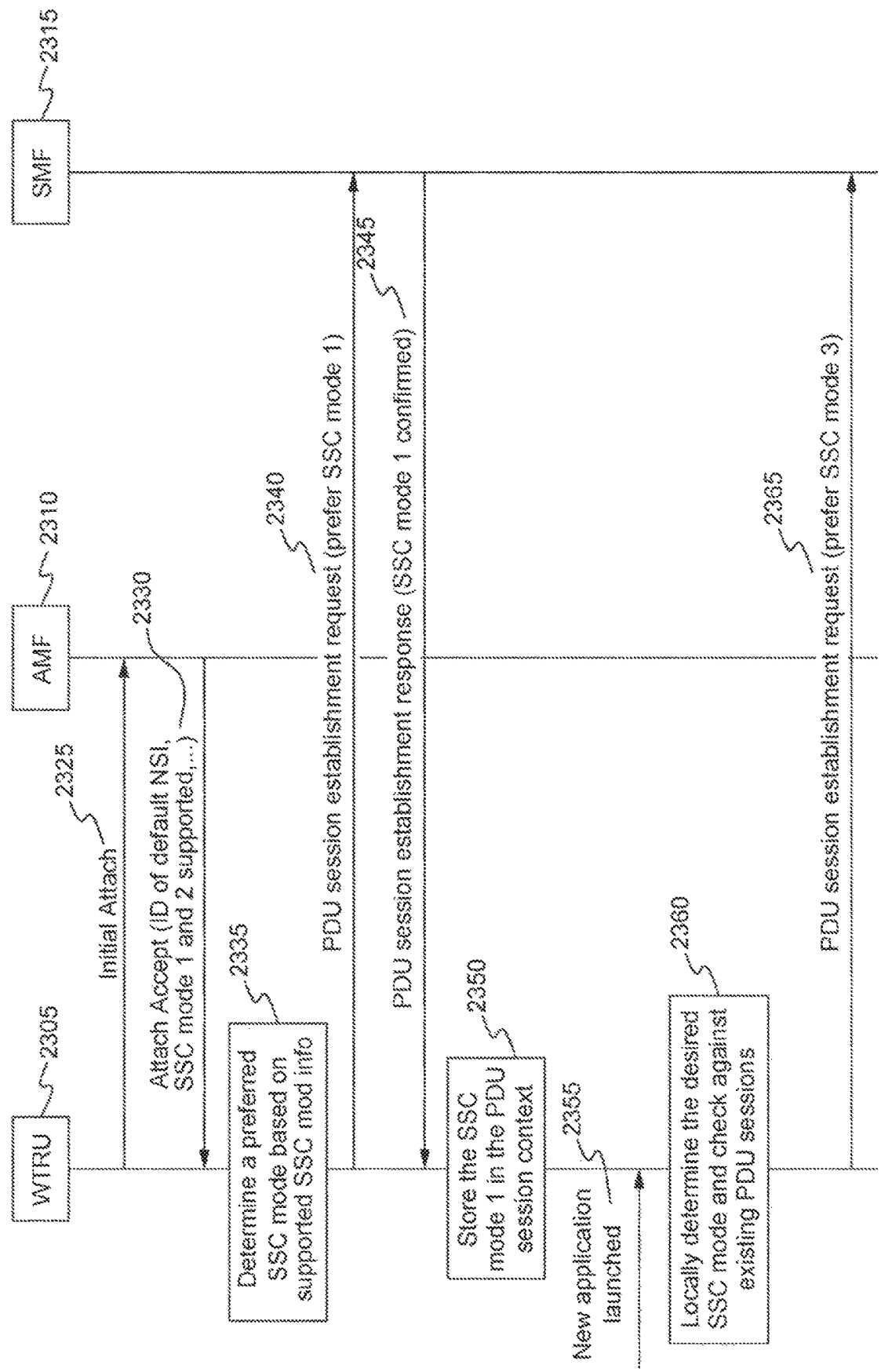
FIG. 23 is a signaling diagram which illustrates determining an SSC mode based on supported SSC mode information.

FIG. 23 is a signaling diagram which illustrates determining an SSC mode based on supported SSC mode information. As shown in FIG. 23, at step 2325, a WTRU 2305 may send an initial attach request to an Access and Mobility Management Function (AMF) 2310. The AMF 2310 may determine a NSI for the WTRU 2305 based on WTRU subscription data, a WTRU's service type, WTRU's mobility characteristics and requirement, or the like. The AMF 2310 and the SMF 2315 may be located within the same NSI or in separate NSIs.

At step 2330, the AMF 2310 may send an attach acceptance message that includes the ID of the selected NSI and supported SSC mode information. The NSI may support multiple SSC modes. For example, one NSI may support SSC modes 1 and 3, but other NSI may support SSC modes 2 and 3. The supported SSC mode information may include a set of SSC mode supported by the selected NSI, for example, an SSC mode 1 and an SSC mode 2. In an embodiment, a NSI may broadcast its supported SSC mode information to neighboring WTRUs as part of the network slice information. The WTRU 2305 may acquire the broadcasted slice information during a slice discovery procedure and store the slice information with its supported SSC mode information. In another embodiment, a NSI may include its supported SSC mode information in a PDU session establishment response message. The WTRU 2305 may receive the PDU session establishment response message and store the supported SSC mode information.

Upon receiving the attach accept message, the WTRU 2305 may determine a preferred SSC mode (e.g., SSC mode 1) based on the supported SSC mode information at step 2335. The WTRU 2305 may then transmit a PDU session establishment request to the SMF 2315 with its preferred SSC mode (e.g., SSC mode 1) at step 2340. Upon receiving the PDU session establishment request, the SMF 2315 may assign a UPF to establish a PDU session that supports the preferred SSC mode. At step 2345, the SMF 2315 may send a PDU session establishment response to the WTRU 2305 that confirms the requested preferred SSC mode (e.g., SSC mode 1).

A PDU session may also be established shortly after the attach procedure. The WTRU 2305 may store the determined SSC mode (e.g., SSC mode 1) in the PDU session context at step 2350. The WTRU 1205 may also store the SSC mode in the context of the NSI. If a new application is launched at step 2355, the WTRU 2305 may locally determine a preferred SSC mode for the new application and check against the confirmed SSC mode for the existing PDU sessions at step 2360. If the confirmed SSC mode (e.g., SSC mode 1) does not satisfy the session continuity requirement of the new application, the WTRU 2305 may send a PDU session establishment request to the SMF 2315 with its preferred SSC mode (e.g., SSC mode 3).

Figure 24:
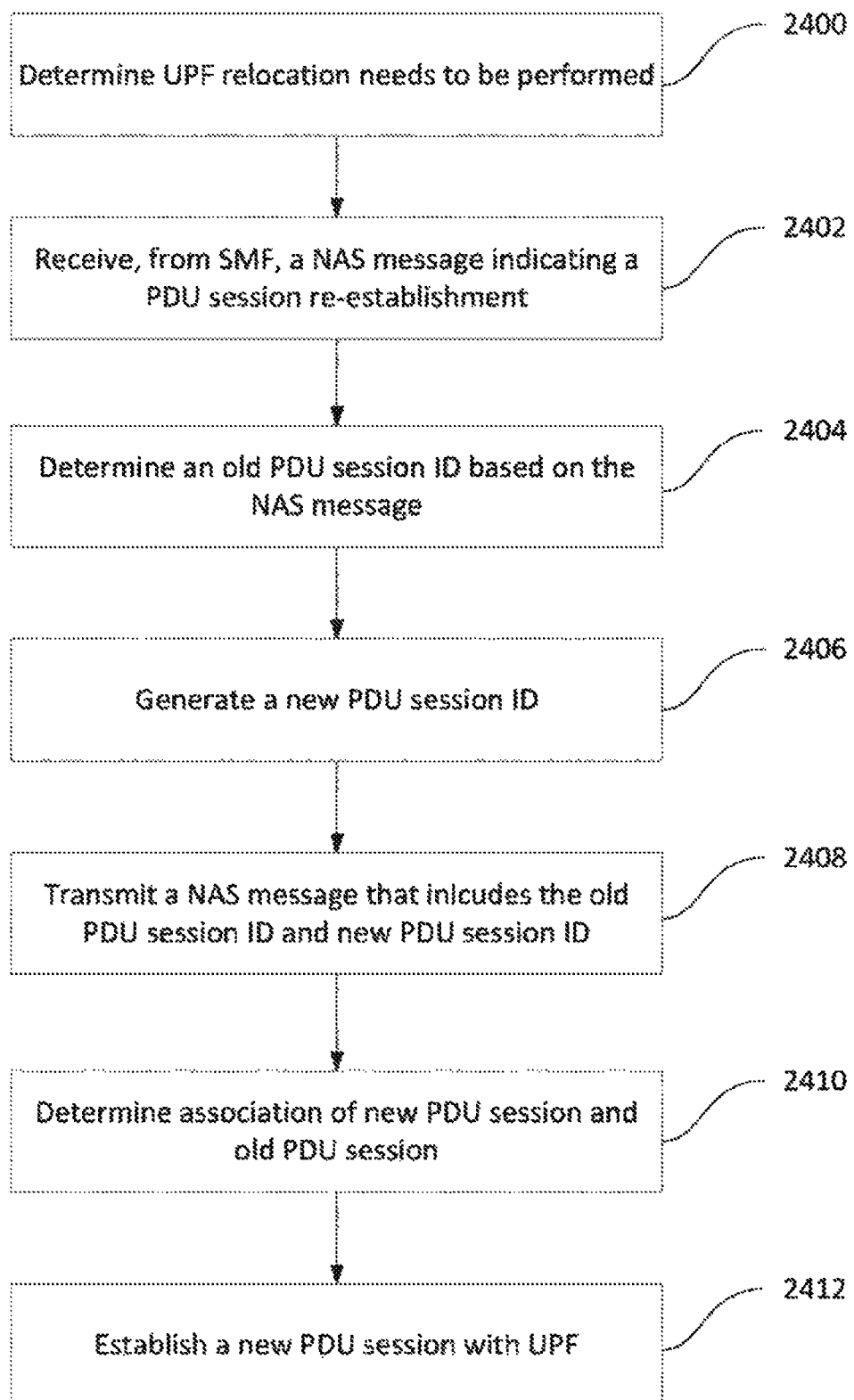
FIG. 24 a diagram illustrating an example procedure for providing session continuity during the User Plane Function (UPF) relocation.

FIG. 24 illustrates an example procedure for providing session continuity during the User Plane Function (UPF) relocation. Assuming that a PDU session with an SSC mode is already established between a WTRU and a UPF, a SMF may determine that the UPF needs to be relocated at step 2400 when a different SSC mode handling is required for the existing PDU session. Upon determining the UPF relocation required for the existing PDU session, the SMF may send a NAS message with an indication of PDU session establishment or re-establishment requested. The WTRU may receive the NAS message via an Access Network (AN) at step 2402.

The NAS message may contain a PDU session ID for the existing PDU session (hereinafter, referred to as an old PDU session ID) and a timer value indicating how long the network is willing to maintain the PDU session. The WTRU may generate a new PDU session ID according to the SSC mode at step 2406 and transmit a NAS message that includes the old PDU session ID and/or the new PDU session ID to the SMF via the AMF at step 2408. The NAS message may indicate a PDU session establishment request that comprises a session management (SM) part and a mobility management (MM) part. The new PDU session ID may be included in the SM part of the PDU session establishment request, for example, in N1 SM information. The old PDU session ID (i.e. APSI) may be included in the MM part of the PDU session establishment request. The WTRU may send the NAS message to the AMF, thereby the AMF may select the SMF based on the old PDU session ID in the MM part of the PDU session request. The AMF then may route the PDU session establishment request to the SMF. In an embodiment, the AMF may send only the SM part of the PDU session establishment message to the SMF.

Upon receiving the PDU session establishment request, the SMF may check the N1 SM information and determine that the request is related to a new PDU session according the new PDU session ID at step 2410. The SMF 2212 may also associate the request with the old PDU session according to the old PDU session ID at step 2410. After the SMF determines a new UPF that is related to a new PDU session ID, the WTRU may perform a new PDU session establishment procedure with a new UPF at step 2412. The old UPF that is associated with the old PDU session and the new UPF that is associated with the new PDU session may be located in the same NSI or in separated NSIs.

The processes and instrumentalities described herein may apply in any combination, may apply to other wireless technologies, and for other services. A WTRU may refer to an identity of the physical device, or to the user's identity such as subscription related identities, for example, MSISDN, SIP URI or the like. WTRU may refer to application-based identities, for example, user names that may be used per application.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a wireless transmit/receive unit (WTRU), the method comprising:
   receiving, from a session management function (SMF), a first Non-Access Stratum (NAS) message indicating a Packet Data Unit (PDU) session re-establishment; and
   transmitting a second NAS message that is a mobility management (MM) message indicating a PDU session establishment request, wherein the MM message includes a session management (SM) message, an old PDU session ID, and a new PDU session ID, wherein the SM message includes the new PDU session ID,
   wherein the old PDU session ID is associated with an existing PDU session to be released after a new PDU session is established and wherein the new PDU session ID is associated with the new PDU session to be established.

2. The method of claim 1, further comprising:
   determining the old PDU session ID based on the first NAS message; and
   generating the new PDU session ID to establish the new PDU session.

3. The method of claim 1, wherein the first NAS message includes the old PDU session ID associated with the existing PDU session.

4. The method of claim 1, further comprising:
   transmitting the second NAS message to an Access and Mobility Function (AMF), wherein the SM message of the second NAS message is directed to the SMF.

5. The method of claim 1, wherein the SM message further includes an indication of a PDU type, and an indication of a Service Session Continuity (SSC) mode.

6. The method of claim 5, wherein the SSC mode includes an SSC mode 1, an SSC mode 2 and an SSC mode 3.

7. The method of claim 6, wherein the SSC mode 3 allows the WTRU to establish the new PDU session before the existing PDU session is terminated.

8. The method of claim 1, further comprising:
   releasing the existing PDU session with a first user plane function (UPF); and
   establishing the new PDU session with a second UPF.

9. A wireless transmit/receive unit (WTRU) comprising:
   a receiver configured to receive, from a session management function (SMF), a first Non-Access Stratum (NAS) message indicating a Packet Data Unit (PDU) session re-establishment; and
   a transmitter configured to transmit a second NAS message, being that is a mobility management (MM) message indicating a PDU session establishment request, wherein the MM message includes a session management (SM) message, an old PDU session ID, and a new PDU session ID, wherein the SM message includes the new PDU session ID,
   wherein the old PDU session ID is associated with an existing PDU session to be released after a new PDU session is established and wherein the new PDU session ID is associated with the new PDU session to be established.

10. The WTRU of claim 9, further comprising a processor configured to:
    determine the old PDU session ID based on the first NAS message; and
    generate the new PDU session ID to establish the new PDU session.

11. The WTRU of claim 9, wherein the first NAS message includes the old PDU session ID associated with the existing PDU session.

12. The WTRU of claim 9, wherein the transmitter is further configured to transmit the second NAS message to an Access and Mobility Function (AMF) wherein the SM message of the second NAS message is directed to the SMF.

13. The WTRU of claim 9, wherein the SM message further includes an indication of a PDU type, and an indication of a Service Session Continuity (SSC) mode.

14. The WTRU of claim 13, wherein the SSC mode includes an SSC mode 1, an SSC mode 2 and an SSC mode 3.

15. The WTRU of claim 14, wherein the SSC mode 3 allows the WTRU to establish the new PDU session before the existing PDU session is terminated.

16. The WTRU of claim 9, further comprising a processor configured to:
    release the existing PDU session with a first user plane function (UPF); and
    establish the new PDU session with a second UPF.

* * * * *